United States Patent [19]
Uehara

[11] Patent Number: 5,938,707
[45] Date of Patent: *Aug. 17, 1999

[54] AUTOMATIC STEERING SYSTEM FOR AUTOMATICALLY CHANGING A MOVING LINE

[75] Inventor: Yasuo Uehara, Toyota, Japan

[73] Assignee: Toyota Jidosha Kabushiki Kaisha, Aichi-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/696,539

[22] Filed: Aug. 14, 1996

[30] Foreign Application Priority Data

Aug. 23, 1995 [JP] Japan .................................. 7-215014

[51] Int. Cl.⁶ .............................. G05D 1/03; G08G 1/04
[52] U.S. Cl. .............................. 701/41; 701/23; 701/117; 180/167; 180/169
[58] Field of Search ................................ 701/23, 28, 41, 701/42, 117, 118, 119, 208, 300; 180/167, 168, 169, 408, 410, 411

[56] References Cited

U.S. PATENT DOCUMENTS

| | | | |
|---|---|---|---|
| 3,668,624 | 6/1972 | Spaulding | 340/905 |
| 4,215,759 | 8/1980 | Diaz | 180/168 |
| 4,361,202 | 11/1982 | Minovitch | 180/168 |
| 4,401,181 | 8/1983 | Schwarz | 340/905 |
| 4,656,406 | 4/1987 | Houskamp | 318/587 |
| 4,656,463 | 4/1987 | Anders et al. | 340/572 |
| 4,846,297 | 7/1989 | Field et al. | 180/169 |
| 4,962,457 | 10/1990 | Chen et al. | 701/200 |
| 4,986,384 | 1/1991 | Okamoto et al. | 180/169 |
| 5,000,279 | 3/1991 | Kondo et al. | 180/169 |
| 5,036,935 | 8/1991 | Kohara | 180/279 |
| 5,127,486 | 7/1992 | Yardley et al. | 180/168 |
| 5,172,315 | 12/1992 | Asanuma et al. | 701/28 |
| 5,189,612 | 2/1993 | Lemercier et al. | 701/23 |
| 5,218,542 | 6/1993 | Endo et all. | 701/27 |
| 5,229,941 | 7/1993 | Hattori | 701/26 |
| 5,249,027 | 9/1993 | Mathur et al. | 356/3.14 |
| 5,289,183 | 2/1994 | Hassett et al. | 340/905 |
| 5,295,551 | 3/1994 | Sukonick | 180/167 |
| 5,331,561 | 7/1994 | Barrett et al. | 701/205 |
| 5,347,456 | 9/1994 | Zhang et al. | 364/424.02 |
| 5,357,432 | 10/1994 | Margolis et al. | 701/23 |
| 5,369,591 | 11/1994 | Broxmeyer | 701/301 |
| 5,381,095 | 1/1995 | Andrews | 324/326 |
| 5,387,916 | 2/1995 | Cohn | 342/44 |
| 5,416,711 | 5/1995 | Gran et al. | 701/117 |
| 5,420,794 | 5/1995 | James | 701/117 |
| 5,424,726 | 6/1995 | Beymer | 340/902 |
| 5,434,781 | 7/1995 | Alofs et al. | 701/23 |
| 5,504,482 | 4/1996 | Schreder | 340/995 |

FOREIGN PATENT DOCUMENTS

| | | |
|---|---|---|
| A-0420447 | 4/1991 | European Pat. Off. . |
| A-2242174 | 9/1991 | European Pat. Off. . |
| 58-183514 | 12/1983 | Japan . |
| 1-253007 | 10/1989 | Japan . |
| 3-142505 | 6/1991 | Japan . |
| A-2235313 | 2/1991 | United Kingdom . |
| A-2275792 | 9/1994 | United Kingdom . |

*Primary Examiner*—Tan Nguyen
*Attorney, Agent, or Firm*—Kenyon & Kenyon

[57] ABSTRACT

An automatic steering system which reduces formation of a wheel track by changing a relative position of a vehicle with respect to a road. A reference line is provided along a road so that a vehicle moves along the reference line. The vehicle moves on the road while an amount of shift from the reference line is controlled to be equal to a target amount of shift. The amount of shift is a distance between a predetermined position of the vehicle and the reference line. A moving line of the vehicle is fluctuated with respect to time in a direction substantially perpendicular to an extending direction of the reference line. Alternatively, the reference line may be shifted in a direction substantially perpendicular to the extending direction of the reference line.

29 Claims, 14 Drawing Sheets

AUTOMATIC STEERING SYSTEM FOR AUTOMATICALLY CHANGING A MOVING LINE

BACKGROUND OF THE INVENTION

1. Field of the Invention

The present invention generally relates to an automatic steering system and, more particularly, to an automatic steering system for controlling a steering angle so that a vehicle traces a reference line provided along a road.

2. Description of the Related Art

Conventionally, a system enabling an automatic running or directional movement control of a vehicle path is known such as disclosed, for example, in Japanese Laid-Open Patent Application No. 1-253007. In this system, a plurality of magnetic markers are buried in a road along a predetermined path of a vehicle so that directional movement of the vehicle is automatically controlled while tracing the magnetic markers.

In the above-mentioned system a plurality of magnetic signals are generated along the moving path of the vehicle. The intensity of each magnetic signal is strong in the vicinity of the corresponding magnetic marker, and is decreased as the distance from the magnetic marker is increased. In the conventional system, a movement direction of a vehicle is controlled so that the intensity of the magnetic signal detected by a magnetic pickup provided on the vehicle is maximized. The vehicle sequentially traces the magnetic markers, and thus the automatic directional movement control of the vehicle is achieved.

However, in the above-mentioned conventional system in which a vehicle traces magnetic markers, many vehicles run almost the same path. In such a condition, wheel tracks or ruts may be formed on the road surface in a relatively short period of time. Accordingly, if the conventional system is used for constructing an automatic vehicle directional movement control system for many vehicles, the road surface must be frequently repaired to remove the wheel tracks. This increases maintenance cost of the road. Additionally, the maintenance construction of the road may limit availability of the road. Thus, the merit of the automatic vehicle directional movement control system cannot be sufficiently demonstrated.

Additionally, a directional movement control path in a curve may be varied within a lane so as to provide a safe control. That is, a vehicle may enter a curve from an outer side of a lane and move to an inner side in the middle of the curve and exit from an outer side of the curve (this running or movement path is referred to as out-in-out), or a vehicle may enter a curve from an inner side of a lane and keep the inner side until the vehicle exits the curve (this running or movement path is referred to as in-in-in). In order to achieve such a running or movement path in the conventional automatic vehicle directional movement control system, the magnetic markers provided in a curve must be buried along the out-in-out path or in-in-in path. In other words, in the conventional system in which each magnetic marker is buried in a predetermined position with respect to a width of a lane (for example, in the center of the lane) whether the lane is straight or curved, a vehicle can only take a single running or movement path. Thus, in the conventional system, there is a problem in that the entire width of a lane cannot be efficiently used.

Additionally, the running or movement path of a vehicle must be offset from a regular path during road construction or when a vehicle is stopped accidentally on a road. Thus, in the conventional system, there is also a problem in that a vehicle cannot cooperate with an unexpected event on the road.

SUMMARY OF THE INVENTION

It is a general object of the present invention to provide an improved and useful automatic steering system in which the above-mentioned problems are eliminated.

A more specific object of the present invention is to provide an automatic steering system which can reduce formation of a wheel track by changing the relative position of the vehicle with respect to a road.

Another object of the present invention is to provide an automatic steering system in which a vehicle can take an appropriate running or movement path in response to a condition of a road.

In order to achieve the above-mentioned objects, there is provided according to the present invention an automatic steering system comprising:

a reference line provided along a road so that a vehicle moves along the reference line, the vehicle moving on the road with an amount of shift from the reference line controlled to a target amount of shift, the amount of shift being a distance between a predetermined position of the vehicle and the reference line; and fluctuating means for fluctuating, with respect to passage of time, a moving line of the vehicle in a direction substantially perpendicular to an extending direction of the reference line.

According to the above-mentioned invention, since the moving line of each vehicle is fluctuated with respect to passage of time, each vehicle running on the same road does not trace the same moving line. Thus, formation of wheel tracks is suppressed.

In one embodiment, the fluctuating means may fluctuate the target amount of shift in accordance with a predetermined time function.

Additionally, the reference line may be defined by a plurality of markers provided along the road, each of the markers generating a signal, and the fluctuating means comprises a plurality of detecting units provided on the vehicle to detect the signal, the amount of shift being determined based on a difference in intensity between outputs of the detecting units.

Each of the detecting units may comprise a sensor for detecting the signal and an amplification unit for amplifying an output of the sensor, the target amount of shift being set by changing an amplification rate of the amplification unit.

Accordingly, fluctuation of the moving line can be achieved in a simple way without a mechanical structure which may move the sensors.

Additionally, the automatic steering system according to the present invention may further comprise wheel track detecting means for detecting a state of wheel tracks formed on the road and moving line changing means for changing the moving line of the vehicle in a direction substantially perpendicular to an extending direction of the reference line in accordance with the state of the wheel tracks.

Accordingly, a moving line of the vehicle can be set in accordance with a depth of the wheel tracks formed on the road. That is, if the wheel tracks are shallow, a moving line may be set so that the wheels of the vehicle are offset from the wheel tracks formed in the road. This will decrease the depth of the wheel tracks since an area of road surface other then the wheel tracks is worn. On the other hand, if the wheel tracks are deep, a moving line may be set so that the wheels of the vehicle trace the wheel tracks to maintain a stable directional movement.

In one embodiment, the reference line may be defined by a plurality of markers provided along the road, each of the markers generating a signal, and the moving line changing means comprises a plurality of detecting units provided on the vehicle to detect the signal, the amount of shift being determined based on a difference in intensity between outputs of the detecting units.

Each of the detecting units may comprise a sensor for detecting the signal and an amplification unit for amplifying an output of the sensor, the target amount of shift being set by changing an amplification rate of the amplification unit.

Additionally, the automatic steering system according to the present invention may further comprise moving line setting means for setting the moving line of the vehicle in accordance with a road condition and moving line changing means for changing the target amount of shift in accordance with the moving line set by the moving line setting means.

The road condition may include a road construction area or an accident area on the road. Thus, the vehicle can avoid such a road construction area or an accident area by changing the moving line.

In one embodiment, a reference line may be defined by a plurality of markers provided along the road, each of the markers generating a signal, and the moving line changing means comprises a plurality of detecting units provided on the vehicle to detect the signal, the amount of shift being determined based on a difference in intensity between outputs of the detecting units.

Each of the detecting units may comprise a sensor for detecting the signal and an amplification unit for amplifying an output of the sensor, the target amount of shift being set by changing an amplification rate of the amplification unit.

Additionally, the moving line setting means may comprise communication means for performing a communication between the vehicle and an administration center to transmit information with respect to the road condition from the administration center to the vehicle.

The communication may be performed via a plurality of beacons provided along the road. The vehicle may transmit information with respect to the road condition to the administration center. The moving line setting means may comprise communication means for performing a communication between the vehicle and other vehicles running ahead of the vehicle to transmit information with respect to the road condition from the other vehicles to the vehicle.

Additionally, according to another aspect of the invention, the fluctuating means may shift the reference line in a direction substantially perpendicular to the extending direction of the reference line.

When the reference line is shifted, the moving line of the vehicle is also shifted since the vehicle is controlled to trace the reference line. Thus, the moving line of each vehicle is fluctuated with respect to passage of time. This provides a result in which each vehicle running on the same road does not trace the same moving line. Thus, formation of wheel tracks is suppressed.

In one embodiment, the reference line may be defined by a plurality of markers provided along the road, each of the markers being selected from one of groups of markers provided in a direction substantially perpendicular to an extending direction of the road at a predetermined interval, each of the selected markers generating a signal. The target amount of shift may be set to be equal to zero.

The fluctuating means may shift the reference line by changing a selection of the markers among markers in each of the groups of markers.

Each of the detecting units may comprise a sensor for detecting the signal and an amplification unit for amplifying an output of the sensor, the target amount of shift being set by changing an amplification rate of the amplification unit.

Additionally, the automatic steering system according to the present invention may further comprise wheel track detecting means for detecting a state of wheel tracks formed on the road and moving line changing means for changing the moving line of the vehicle in a direction substantially perpendicular to an extending direction of the reference line in accordance with the state of the wheel tracks.

Accordingly, a moving line of the vehicle can be set in accordance with the depth of the wheel tracks formed on the road. That is, if the wheel tracks are shallow, a moving line may be set so that the wheels of the vehicle are offset from the wheel tracks. This decreases the ware rate of the wheel tracks since an area of road surface other then the wheel tracks is worn. On the other hand, if the wheel tracks are deep, a moving line may be set so that the wheels of the vehicle trace the wheel tracks to maintain a stable running.

The moving line changing means may comprise a plurality of detecting units provided on the vehicle to detect the signal, the amount of shift being determined based on a difference in intensity between outputs of the detecting units.

Each of the detecting units may comprise a sensor for detecting the signal and an amplification unit for amplifying an output of the sensor, the target amount of shift being set by changing an amplification rate of the amplification unit.

Additionally, the automatic steering system according to the present invention may further comprise moving line setting means for setting the moving line of the vehicle in accordance with a road condition and moving line changing means for shifting the reference line by changing a selection of the markers among markers in each of the groups of markers.

The road condition may include a road construction area or an accident area on the road. Thus, the vehicle can avoid such a road construction area or accident area by changing the moving line.

The moving line changing means may comprise a plurality of detecting units provided on the vehicle to detect the signal, the amount of shift being determined based on a difference in intensity between outputs of the detecting units.

Each of the detecting units comprises a sensor for detecting the signal and an amplification unit for amplifying an of the sensor, the target amount of shift being set by changing an amplification rate of the amplification unit.

Additionally, the moving line setting means comprises communication means for performing a communication between the vehicle and an administration center to transmit information with respect to the road condition from the administration center to the vehicle.

The communication may be performed via a plurality of beacons provided along the road. The vehicle may transmit information with respect to the road condition to the administration center.

Further, the moving line setting means may comprise communication means for performing a communication between the vehicle and other vehicles moving ahead of the vehicle to transmit information with respect to the road condition from the other vehicles to the vehicle.

Other objects, features and advantages of the present invention will become more apparent from the following detailed description when read in conjunction with the accompanying drawings.

DETAILED DESCRIPTION OF THE PREFERRED EMBODIMENTS

Figure 1:
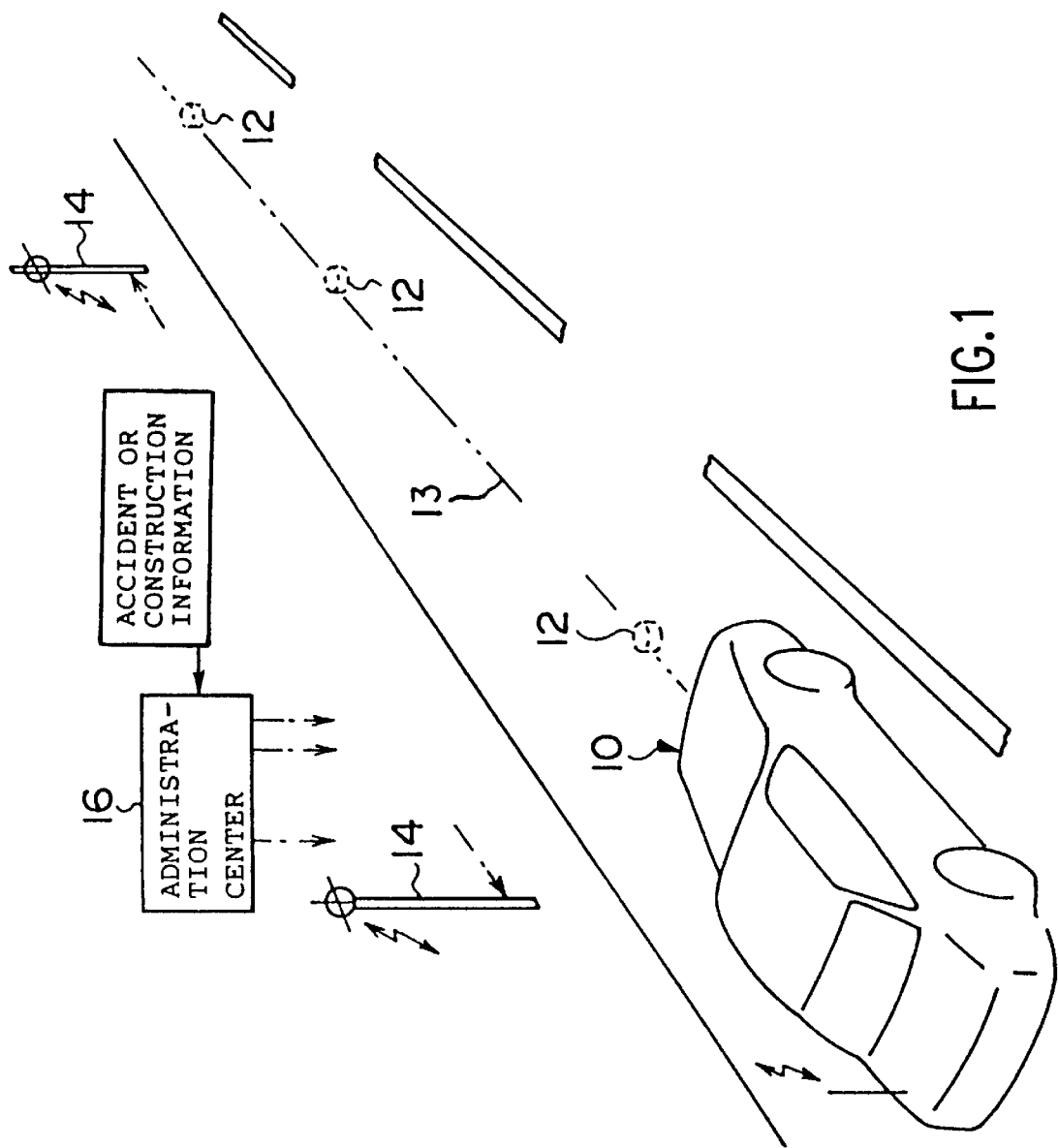
FIG. 1 is an illustration of a structure of an automatic vehicle directional movement control system using a vehicle having an automatic steering apparatus used in an automatic steering system according to a first embodiment of the present invention.

A description will now be given of a first embodiment of the present invention. FIG. 1 is an illustration of a structure of an automatic vehicle directional movement control system for use with a vehicle 10 having an automatic steering apparatus in an automatic steering system according to the first embodiment of the present invention. An infrastructure constituting a part of the automatic steering system is provided along a road side.

In the present embodiment, the infrastructure includes a plurality of magnetic markers 12 buried in a road at a predetermined interval, a plurality of beacons 14 provided along a side of the road at a predetermined interval and an administration center 16 communicating with the beacons 14.

Each of the magnetic markers 12 generates a magnetic field extending upwardly of the road. The intensity of the magnetic field is maximum at a position directly above each of the magnetic markers 12. In the present embodiment, the magnetic markers 12 are buried in the center of a lane of the road. Hereinafter, a line extending along the center of the lane, which line connects each magnetic marker 12, is referred to as a reference line 13. In FIG. 1, the reference line is indicated by a double dashed chain line. Each of the beacons 14 is provided with a transmitter and a receiver so as to communicate with the administration center 16. The administration center 16 obtains information including accident information, construction information and traffic control information. The administration center 16 generates a guiding signal based on the obtained information, and sends the guiding signal to the vehicle 10 via the beacons 14.

Figure 2:
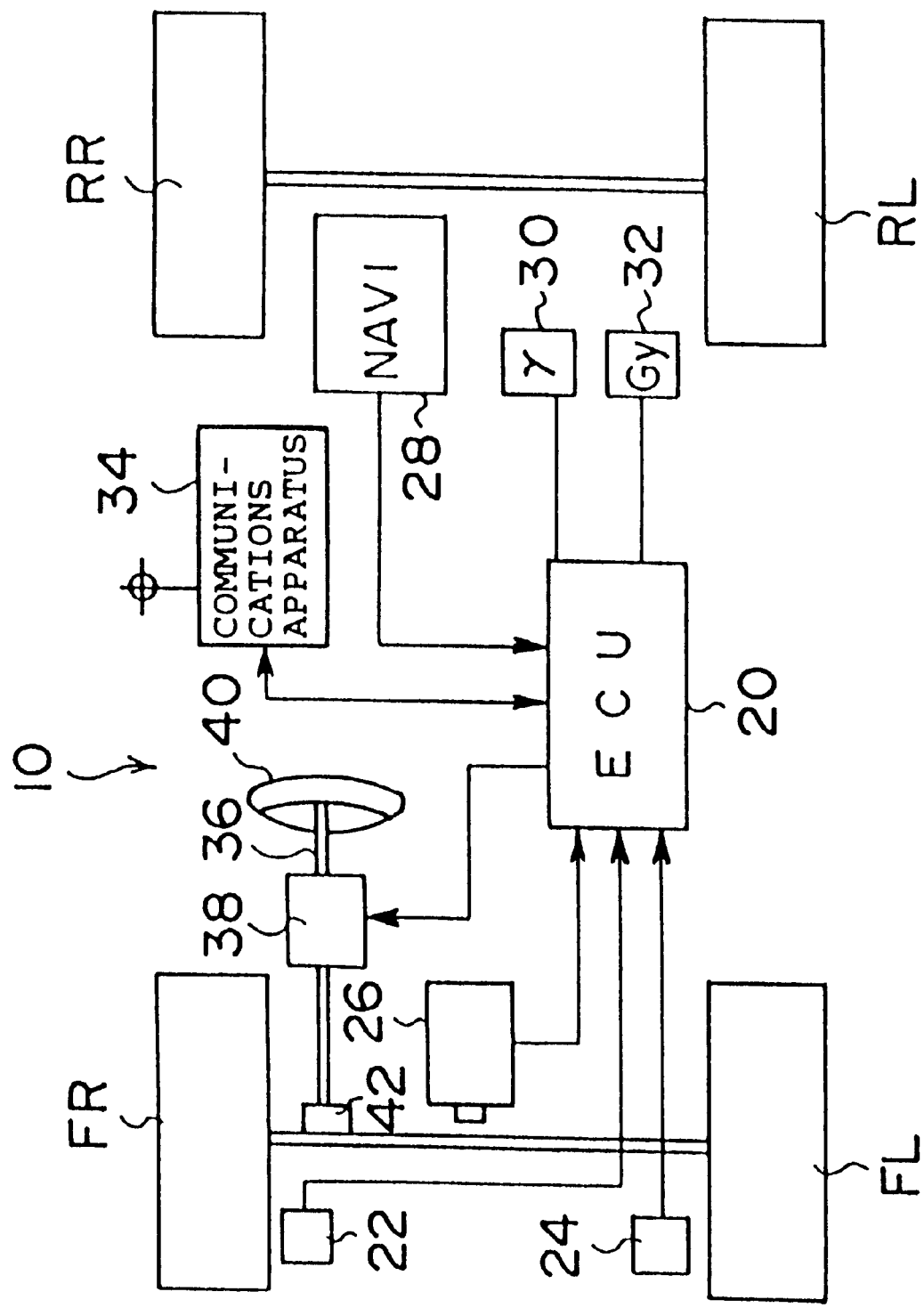
FIG. 2 is a block diagram of the automatic steering apparatus provided on the vehicle shown in FIG. 1.

FIG. 2 is a block diagram of the automatic steering apparatus provided on the vehicle 10. In FIG. 2, FL and FR indicate left and right front wheels, respectively, and RL and RR indicate left and right rear wheels, respectively. The automatic steering apparatus shown in FIG. 2 is controlled by an electronic control unit ECU 20.

Two magnetic pickup sensors 22 and 24 are provided in the front end of the vehicle 10. The magnetic pickup sensors 22 and 24 are spaced apart a predetermined distance from each other. Each of the magnetic pickup sensors 22 and 24 generates a signal in response to the intensity of a magnetic field applied thereto. The magnetic pickup sensors 22 and 24 supply the signal to the ECU 20. In the present embodiment, the magnetic pickup sensors 22 and 24 are symmetrically arranged on the right and left sides of the vehicle 10, respectively. The ECU 20 determines a relative position of the vehicle 10 with respect to the reference line 13 of the road. That is, the ECU 20 determines a position of the vehicle on the road.

The vehicle 10 is provided with a camera 26 monitoring a front view of the vehicle 10. An image taken by the camera 26 is supplied to the ECU 20. The ECU 20 detects the state of a wheel track formed on the road in front of the vehicle 10.

The vehicle 10 is also provided with a navigation apparatus NAVI 28 to determine a current position of the vehicle 10. The navigation apparatus NAVI 28 utilizes a Global Positioning System (GPS). The navigation apparatus NAVI 28 detects a current position of the vehicle 10 by using a map matching method, and supplies the position data to the ECU 20 together with map data. The ECU 20 calculates a radius of curvature of a road based on the position data and the map data supplied by the navigation apparatus NAVI 28.

A yaw rate sensor 30 and a side acceleration sensor 32 are connected to the ECU 20. The yaw rate sensor 30 detects a yaw rate (yaw velocity) generated about the center of gravity of the vehicle 10. The side acceleration sensor 32 detects a side acceleration $G_y$ generated adjacent to the center of gravity in a side-to-side direction of the vehicle 10. The ECU 20 detects directional motion of the vehicle 10 based on the output signals of the yaw rate sensor 30 and the side acceleration sensor.

The ECU 20 is also connected with a communications apparatus 34 to communicate with the beacons 14. The communications apparatus 34 includes a receiver for receiving a signal transmitted by the beacons 14 and a transmitter for transmitting a signal generated by the ECU 20.

The ECU 20 controls a steering angle δ of the vehicle 10. More specifically, the ECU 20 controls an operation of an electric motor 38 provided on the vehicle 10 to apply a steering torque to a steering shaft 36. One end of the steering shaft 36 is connected to a steering wheel 40 and the other end of the steering shaft 36 is connected to a steering gear-box 42. The steering gear-box 42 transmits a steering torque input by the steering wheel to the left and right front wheels FL and FR by converting the steering torque to a steering effort. Accordingly, the left and right front wheels FL and FR are operated by operation of the electric motor 38 in addition to a steering torque supplied by a driver through the steering wheel 40.

Figure 3:
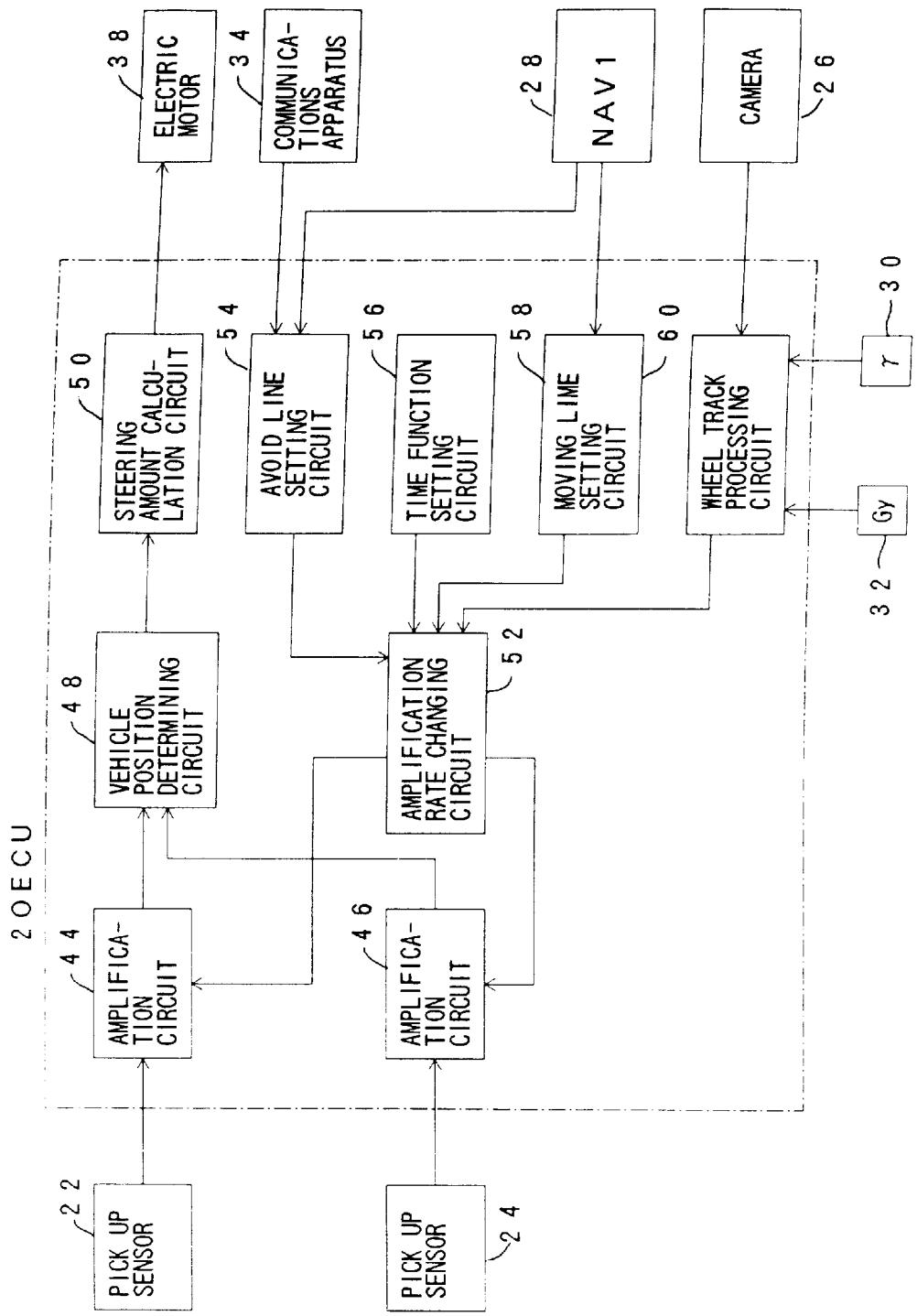
FIG. 3 is a block diagram of an electronic control unit shown in FIG. 2.

FIG. 3 is a block diagram of the ECU 20. AS shown in FIG. 3, the ECU 20 comprises amplification circuits 44 and 46 which amplify the output signal of the respective magnetic pickup sensors 22 and 24. Output signals of the amplification circuits 44 and 46 are supplied to a vehicle position determining circuit 48. If the amplification rate of the amplification circuits 44 and 46 is equal to each other, the output signals of the amplification circuits 44 and 46 are equal to each other when the center (hereinafter referred to as a vehicle center) of the vehicle 10 is positioned directly above the reference line 13. However, when the vehicle center is shifted to the left of the reference line 13, the output signal level of the amplification circuit 44 is greater than the output signal level of the amplification circuit 46. On the other hand, when the vehicle center is shifted to the right of the reference line 13, the output signal level of the amplification circuit 46 is greater than the output signal level of the amplification circuit 44. Accordingly, a difference between the output signal levels of the amplification circuits 44 and 46 varies in response to a position of the vehicle 10 relative to the reference line of the road. The vehicle position determining circuit 48 generates a signal corresponding to the relative position of the vehicle 10 with respect to the road based on the output signals of the amplification circuits 44 and 46. More specifically, the vehicle position determining circuit 48 outputs a signal corresponding to the difference between the output signal of the amplification circuit 44 and the output signal of the amplification circuit 46.

The signal output from the vehicle position determining circuit 48 is supplied to a steering amount calculation circuit 50. The steering amount calculation circuit 50 calculates an increasing or decreasing amount of dδ of a steering angle required for the vehicle 10 to be at a desired position relative to the reference line 13 of the road. In the present embodiment, the steering amount calculation circuit 50 calculates the amount dδ which is required to decrease the difference between the output signal levels of the amplification circuits 44 and 46 to zero based on the output signal of the vehicle position determining circuits 48. The output signal of the steering amount calculation circuit 50 is supplied to the electric motor 38. The electric motor 38 supplies a steering torque to the steering shaft 36 so as to achieve the amount d6 calculated by the steering amount calculation circuit 50.

An amplification rate changing circuit 52 is connected to the above-mentioned amplification circuits 44 and 46. The amplification circuits 44 and 46 are constructed so that the amplification rate thereof is changed. The amplification rate is changed based on a signal supplied from the amplification rate changing circuit 52. The amplification rate changing circuit 52 is connected with an avoid line setting circuit 54, a time function setting circuit 56, a moving line setting circuit 58 and a wheel track processing circuit 60. The avoid line setting circuit 54, the time function setting circuit 56, the moving line setting circuit 58 and the wheel track processing circuit 60 are pertinent parts of the automatic steering system according to the present invention.

The avoid line setting circuit 54 is provided to achieve a moving path according to a guiding signal transmitted by the beacons 14. The guiding signal may be transmitted from the beacons 14 near a construction area or an accident area. The navigation apparatus NAVI 28 and the communications apparatus 34 are connected to the avoid line setting circuit 54. The administration center 16 supplies information to the beacons 14 located adjacent to the construction area or the accident area based on construction information or accident information. The information supplied to the beacons 14 includes the location of the construction area or the accident area and information needed for setting a moving path for avoiding the construction area or the accident area. This information is transmitted by the beacons 14 as a guiding signal, and received by the communications apparatus 34 of the vehicle 10. The guiding signal is then sent to the avoid line setting circuit 54. The avoid line setting circuit 54 sets a moving path (an avoid line) of the vehicle 10 to avoid the construction area or the accident area based on the location of the construction area or the accident area, the amount of avoidance necessary to avoid the construction area or the accident area, and map data stored in the navigation apparatus NAVI 28. The avoid line setting circuit 54 supplies to the amplification rate changing circuit 52 a signal corresponding to a necessary distance to be provided between the reference line 13 and the vehicle center. Thus, the amplification rate of each of the amplification circuits 44 and 46 is changed based on the signal supplied by the amplification rate changing circuit 52 so that the vehicle 10 is moved to the left or right relative to the reference line 13 with an appropriate distance for avoiding the construction or accident area.

Figure 4:
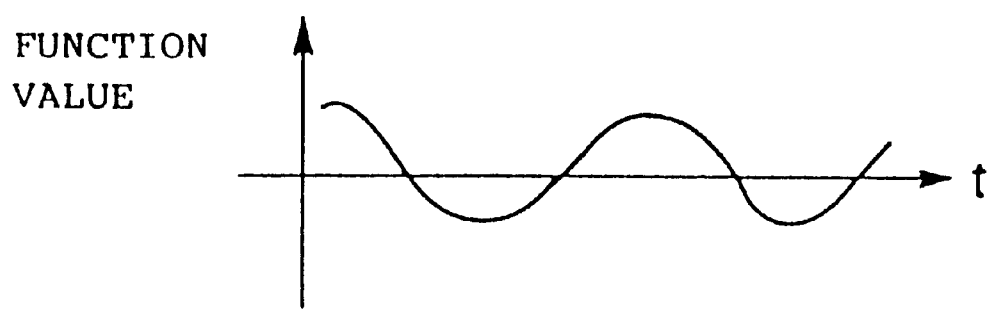
FIG. 4 is an example of a fluctuation pattern of the time function stored in a time function setting circuit shown in FIG. 3.
Figure 5:
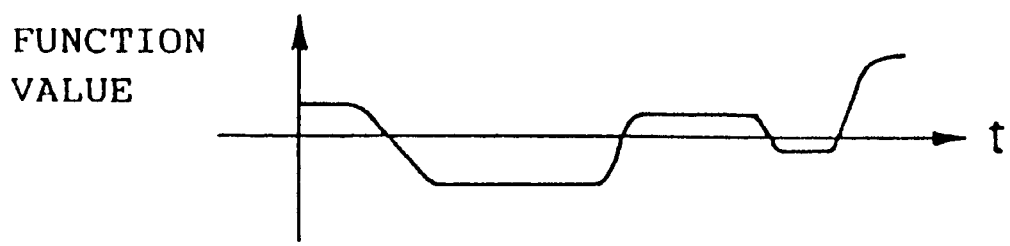
FIG. 5 is another example of the fluctuation pattern of the time function stored in the time function setting circuit shown in FIG. 3.

The time function setting circuit 56 supplies a time function value to the amplification rate changing circuit 52. The time function value periodically fluctuates with respect to passage of time, for example, fluctuating as a sinusoidal waveform. FIG. 4 is an example of the fluctuation pattern of the time function stored in the time function setting circuit 56. When the time function setting circuit 56 supplies the time function value to the amplification rate changing circuit 52, the amplification rate changing circuit 52 changes the amplification rate of each of the amplification circuits 44 and 46 based on the time function. That is, when the time function value is supplied, the vehicle 10 runs along a moving path corresponding to the time function. The rate of fluctuation is set slow so that a passenger in the vehicle 10 does not feel meandering of the vehicle 10. The time function shown in FIG. 4 is an example, and the time function may be a function which randomly fluctuates with respect to passage of time as shown in FIG. 5.

The moving line setting circuit 58 is provided to achieve an appropriate running or moving line in response to curvature and width of the road. The navigation apparatus NAVI 28 is connected to the moving line setting circuit 56 so as to supply information with respect to a curvature and a width of the road. The moving line setting circuit 58 sets the out-in-out moving line when the vehicle 10 is running a curve at a high speed, or sets the in-in-in moving line when the vehicle 10 is running a curve at a low speed. That is, a signal is supplied from the moving line setting circuit 58 to the amplification rate changing circuit 52 so that the amplification rate of each of the amplification circuits 44 and 46 is changed to run the vehicle 10 along the out-in-out line or the in-in-in line.

The wheel track processing circuit 60 is provided to set a moving line in consideration of a wheel track as it is formed on the road surface. The wheel track processing circuit 60 is connected with the camera 26, the yaw rate sensor 30 and the side acceleration sensor 32 as shown in FIG. 3. The wheel track processing circuit 60 determines the presence of a wheel track and a state of the wheel track based on the data with respect to directional movement of the vehicle 10 supplied by the yaw rate sensor 30 and side acceleration sensor 32 and image data of the front view supplied by the camera 26. If it is determined that growth of the wheel track is to such a degree that a stable running can be achieved when the wheels are off the wheel track, a moving line is set so that the wheels of the vehicle 10 are off from the wheel track. Accordingly, a signal corresponding to such a moving line is supplied to the amplification rate changing circuit 52. Thus, the depth of the wheel track on the road does not increase. The depth of the wheel track may be reduced since the road surface adjacent to the wheel track is lowered by wearing. On the other hand, if it is determined that a depth of the wheel track is so large such that a stable running cannot be achieved when the wheels are offset from the wheel track, a moving line is set so that the center of the vehicle 10 corresponds to the center between the two wheel tracks on the road. Accordingly, a signal corresponding to such a moving line is supplied to the amplification rate changing circuit 52. As a result, a stable movement of the vehicle 10 can be achieved when deep wheel tracks are formed on the road. In this case, if the wheel tracks are filled with water, which condition may cause hydroplaning phenomenon, speed of the vehicle 10 may be controlled to avoid such hydroplaning phenomenon.

Figure 6:
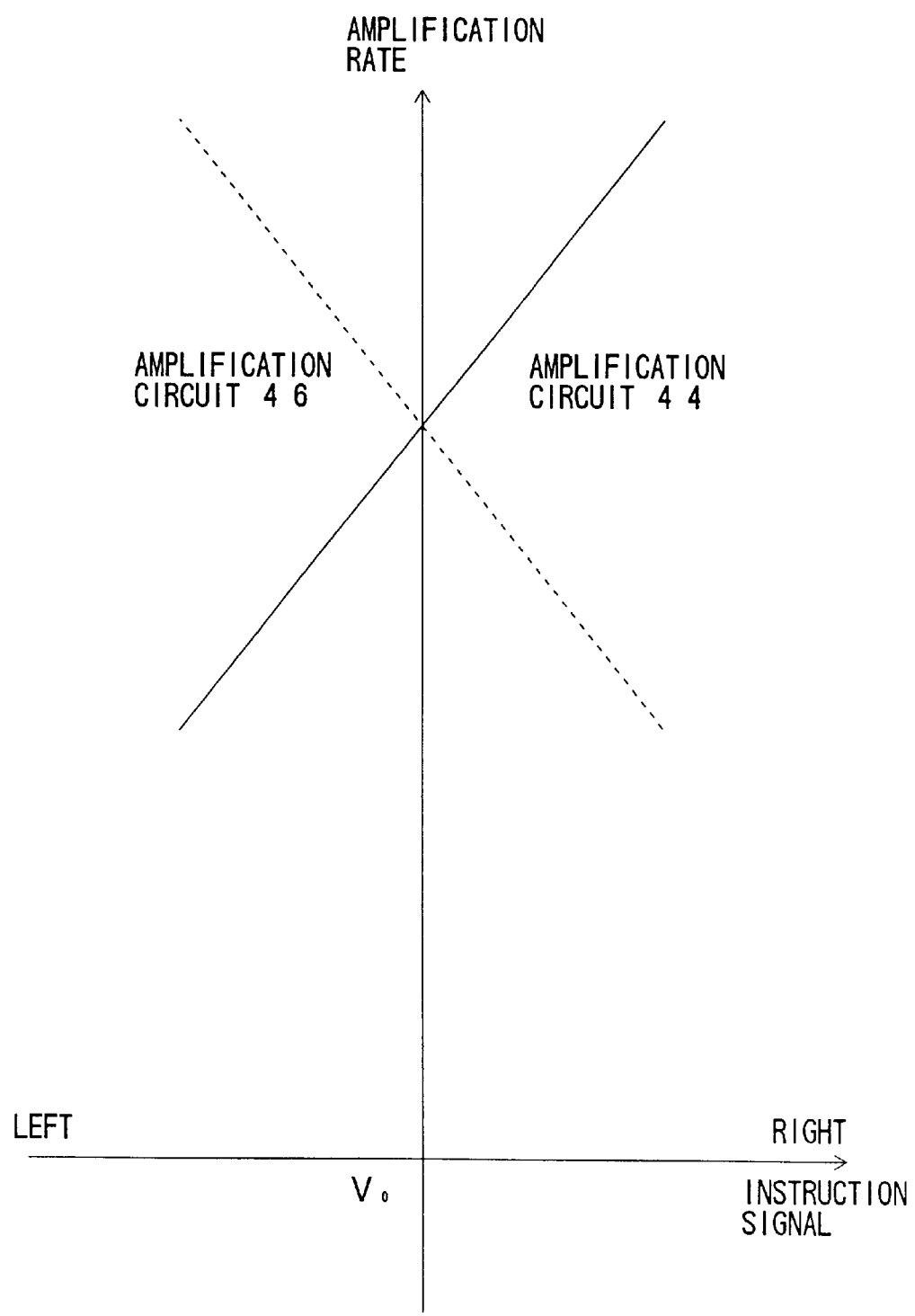
FIG. 6 is a graph showing a relationship between amplification rates of amplification circuits shown in FIG. 3.

As mentioned above, the amplification rate changing circuit 52 changes the amplification of each of the amplification circuits 44 and 46 based on the instruction signals supplied by the avoid line setting circuit 54, the time function setting circuit 56, the moving line setting circuit 58 and the wheel track processing circuit 60. FIG. 6 is a graph representing a relationship between the instruction signal supplied to the amplification rate changing circuit 52 and the amplification rate set in each of the amplification circuits 44 and 46. In FIG. 6, a solid line indicates the amplification rate of the amplification circuit 44, and a dashed line indicates the amplification rate of the amplification circuit 46. With respect to the instruction signal, a reference value $V_0$ is supplied when the vehicle center is to be aligned with the reference line 13 of the road. The value of the instruction signal is increased from the reference value $V_0$ when the vehicle center is to be shifted to the right of the reference line 13. On the other hand, the value of the instruction signal is decreased from the reference value $V_0$ when the vehicle center is to be shifted to the left of the reference line 13.

As shown in FIG. 6, when the instruction signal of the reference value $V_0$ is generated, the amplification rate of the amplification circuit 44 and the amplification rate of the amplification circuit 46 are equal to each other. In this case, the output signal of the amplification circuit 44 and the output signal of the amplification circuit 46 are equal to each other when the vehicle center is aligned with the reference line 13 of the road. As mentioned above, the electric motor 38 generates a torque necessary for decreasing the difference between the output signals of the amplification circuits 44 and 46. Accordingly, in such a case, the vehicle 10 runs so that the vehicle center aligns with the reference line 13.

Figure 7:
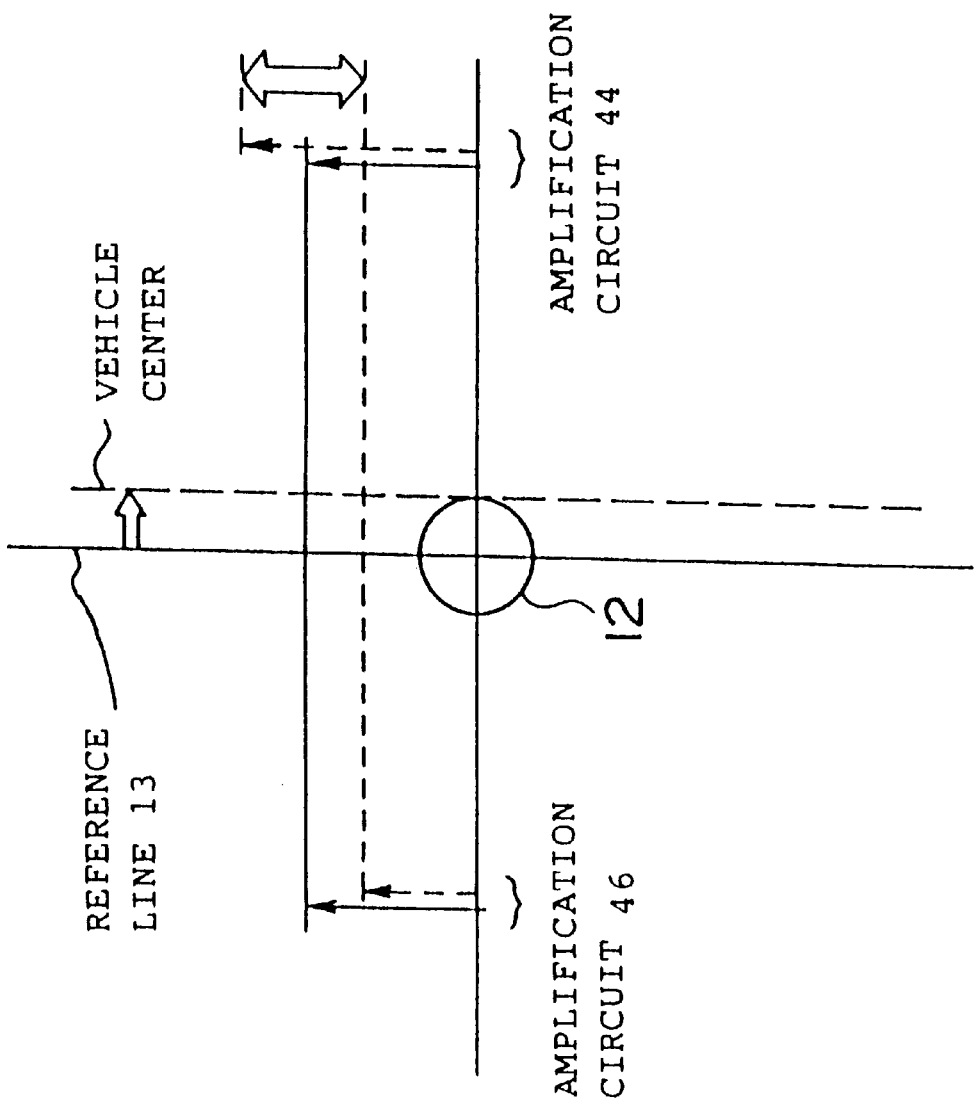
FIG. 7 is an illustration for explaining an operation of the automatic steering apparatus according to the first embodiment of the present invention.

FIG. 7 is an illustration showing an intensity of the signal output from the amplification circuits 44 and 46 when the vehicle 10 passes one of the magnetic markers 12 while the vehicle 10 is moving with the vehicle center aligning with the reference line 13. A solid line in FIG. 7 indicates signal intensity when the amplification rate of the amplification circuits 44 and 46 are equal to each other. In this case, the intensity of the signals of both of the amplification circuits 44 and 46 become almost equal to each other.

A dashed line in FIG. 7 is the intensity of the signal after the signal is varied to an instruction signal requiring that the vehicle center be shifted to the right of the reference line 13. When such an instruction signal is generated, the amplification rate of the amplification circuit 44 is increased, and the amplification rate of the amplification circuit 46 is decreased. Thus, a large output signal is output from the amplification circuit 44 and a small output signal is output from the amplification circuit 46 although a distance between the magnetic pickup 22 and the magnetic markers 12 is equal to a distance between the magnetic pickup 24 and the magnetic markers 12. As a result, there is a difference between the output signals of the amplification circuits 44 and 46. Thus, a steering torque is generated by the electric motor 38 to cancel the difference in a direction, for example, to shift the vehicle center to the right of the reference line 13.

When the intensity of the signal shown by the dashed line of FIG. 7 is achieved, and when the vehicle center is shifted to the right of the reference line 13, the distance between the magnetic pickup sensor 22 and the magnetic marker 12 is increased, and the magnetic pickup sensor 24 and the magnetic marker 12 is decreased. Thus, the intensity of the output signal of the amplification circuit 44 is decreased, and the intensity of the output signal of the amplification circuit 46 is increased so that the difference between them is decreased. The electric motor 38 continuously generates the steering torque until the intensity of the output signal of the amplification circuit 44 becomes equal to the output signal of the amplification circuit 46. Accordingly, a state is achieved where the vehicle center is shifted form the reference line 13 by a distance corresponding to the instruction signals. Similarly, when an instruction signal requiring a shift of the vehicle center to the left of the reference line 13, is supplied to the amplification rate changing circuit 52, the vehicle center is shifted to the left of the reference line 13 by a distance corresponding to the instruction signal.

As mentioned above, according to the present Embodiment, the vehicle 10 moves along a running or movement path according to the instruction signals by supplying an appropriate signal to each of the avoid line setting circuit 54 from a time function setting circuit 56, the moving line setting circuit 58 and the track wheel processing circuit 60. Thus, the vehicle 10 can move along the moving path corresponding to the instruction signals.

Figure 8:
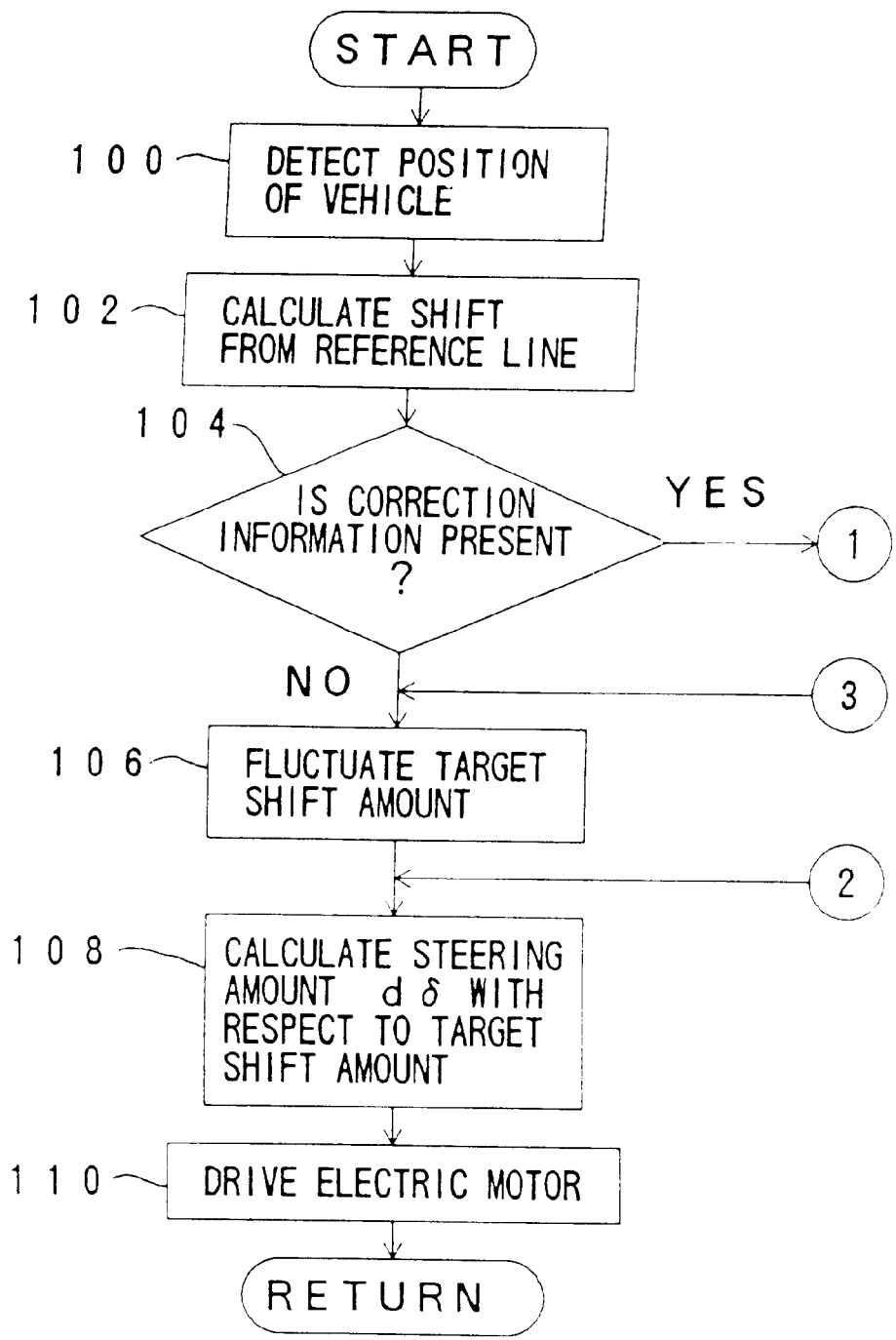
FIGS. 8 and 9 are parts of a flowchart of an operation performed in the ECU 20 to achieve a function described with reference to the block diagram of FIG. 3.
Figure 9:
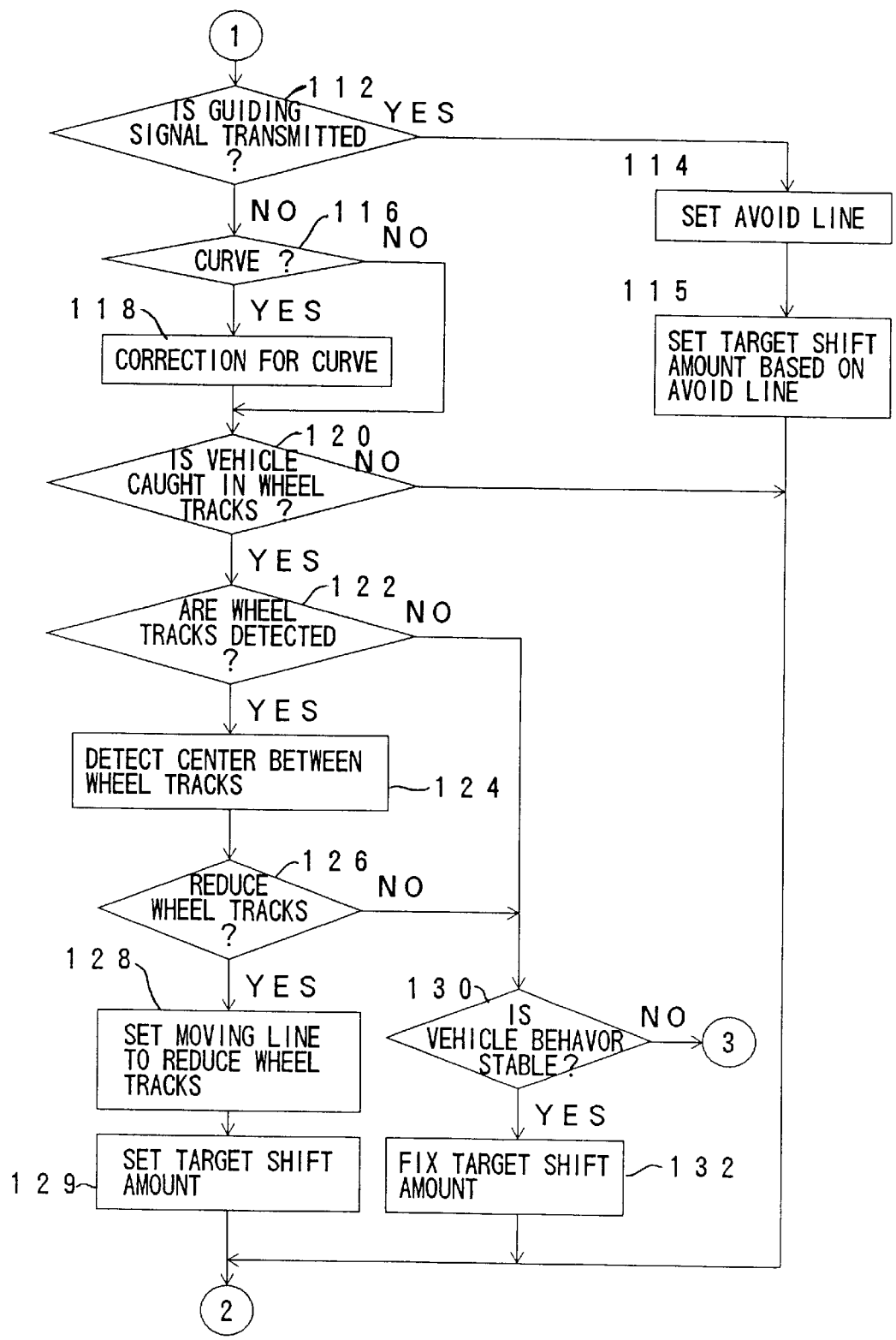

FIGS. 8 and 9 are parts of a flowchart of an operation performed by the automatic steering apparatus according to the present embodiment. The vehicle 10 can move along a desired moving path in response to a running or moving condition by performing an automatic steering operation achieved by the ECU 20 shown in FIGS. 8 and 9.

When the automatic steering operation is started, a position of the vehicle 10 on the road is detected, in step 100 of FIG. 8, based on the output signals of the magnetic pickup sensors 22 and 24. More specifically, the position of the vehicle 10 is detected based on the difference between the intensity of the output signal of the magnetic sensor 22 which is amplified by a first amplification rate and the intensity of the output signal of the magnetic sensor 24 which is amplified by a second amplification rate. The first amplification rate corresponds to the amplification rate of the amplification circuit 44 shown in FIG. 3, and the second amplification rate corresponds to the amplification rate of the amplification circuit 46 shown in FIG. 3.

In step 102, a shift of the vehicle center relative to the reference line 13 is calculated. In the present embodiment, this shift is controlled to be a target amount by operating the electric motor 38 so as to achieve the automatic steering operation.

In step 104, it is determined whether or not there is correction information for the moving path. In this operation, it is determined that the correction information is present when one of the following conditions is detected; 1) a guiding signal for avoiding a construction area or an accident area is transmitted by the beacons 14; 2) a moving line is set for a curve so as to guide the vehicle in a safe condition; and 3) a moving line is set so as to cooperate with a wheel track formed on the road surface.

If it is determined, in step 104, that there is no correction information, the routine proceeds to step 106. In step 106, a process is performed to change a target value (hereinafter referred to as a target shift amount) of an amount of shift of the vehicle center relative to the reference line 13 in accordance with a predetermined time function. The target shift amount is changed in accordance with a time function such as shown in FIGS. 4 or 5. Then, in step 108, a steering amount dδ is calculated for achieving the desired target shift amount. In step 110, the electric motor 38 is operated to achieve the steering amount dδ, and the routine is ended.

When the above-mentioned steps 100 and 110 are repeated, the amount of shift of the vehicle center relative to the reference line 13 is changed in accordance with the predetermined time function. As a result, the vehicle 10 runs in a zigzag line with respect to the reference line 13 with a small amount of shift. In this case, since the contact areas of the wheels of the vehicle 10 are changed in a transverse direction of the road, formation of wheel tracks can be suppressed. Accordingly, the automatic steering apparatus according to the present embodiment is effective for the automatic steering system involving a number of vehicles with respect to suppression of formation of wheel tracks.

When it is determined, in step 104, that the correction information is present, the routine proceeds to step 112. In step 112, it is determined whether or not a guiding signal transmitted by the beacons 14 is received by the communications apparatus of the ECU 20. If it is determined that the guiding signal is received, the routine proceeds to step 114. In step 114, an avoid line is set to avoid a construction area or an accident area which caused the transmission of the guiding signal. Then, in step 115, a target shift amount is calculated based on the avoid line. When the process of step 115 is completed, the routine proceeds to step 108. Thus, the movement of the vehicle 10 according to the target shift amount calculated in step 115 is achieved.

As mentioned above, in the present embodiment, when the vehicle 10 approaches the beacons 14 transmitting the guiding signal, the moving path of the vehicle 10 is changed to the avoid line to avoid the construction area or the accident area. Thus, according to the automatic steering apparatus of the present embodiment, the movement of the vehicle 10 can be automatically controlled while cooperating with an unexpected condition such as road construction or an accident.

If it is determined, in step 112, that the guiding signal is not received, the routine proceeds to step 116. In step S116, it is determined whether or not the road on which the vehicle 10 is running is curved. This determination is made based on data of a current position of the vehicle 10 supplied by the navigation apparatus NAVI 28. The determination may be made based on an image taken by the camera 28. In an alternative case, the determination of a curve may be made by receiving curve information from the beacons 14.

In step 116, if it is determined that the road is curved, the routine proceeds to step 118. In step 118, a correction process is performed on the moving path of the vehicle 10. That is, the moving path of the vehicle 10 is set to an appropriate line to maintain a safe driving condition in response to a radius of curvature, a width of the road and speed of the vehicle 10. On the other hand, if it is determined, in step 116, that the road is not curved, the routine directly proceeds to step 120.

In step 120, it is determined whether or not the wheels of the vehicle 10 are moving in wheel tracks on the road. The determination is made based on an output signal of the yaw rate sensor 30. The ECU 20 stores behavior of a vehicle when the vehicle is in such wheel tracks. Thus, the ECU 20 determines that the vehicle 10 is in a wheel track when such behavior is detected by the yaw rate sensor 30. If it is determined that the vehicle 10 is not maintained or caught in wheel tracks, the routine proceeds to step 108 so as to set an appropriate moving path, and the routine is ended.

If it is determined, in step 122, that the vehicle 10 is being maintained in wheel tracks, the routine proceeds to a step 122. In step 122, is determined whether or not the wheel tracks in front of the vehicle 10 can be detected by the camera 26. If it is determined that the wheel tracks can be detected by the camera 26, the routine proceeds to step 124. In step 124, a center position between the two wheel tracks is detected.

It is then determined, in step 126, whether or not a moving path should be set to reduce wear of the wheel tracks. If the wheel tracks are shallow, the vehicle can be run in a stable condition in a state where the wheels of the vehicle 10 are out of the wheel tracks. In such a state, the road surface adjacent the wheel tracks is worn, and, thus, further increase in the depth of the wheel tracks is reduced. Accordingly, if the wheel tracks are shallow, it is appropriate that a moving path is set so as to move the wheels off from the wheel tracks. On the other hand, if the wheel tracks are deep, it is difficult to maintain a stable running or movement of the vehicle 10 when the wheels are offset from the wheel tracks. Accordingly, in such a state, it is appropriate to set a moving path of the vehicle 10 so that the wheels of the vehicle 10 trace the wheel track so as to maintain a stable and safe directional movement of the vehicle 10.

Accordingly, in the present embodiment, the depth of the wheel tracks is detected in step 124, and it is then determined, in step 126, whether or not the moving path of the vehicle 10 should be set based on a determination of whether or not the depth of the wheel tracks exceeds a predetermined threshold value. If it is determined that the moving path should be set to reduce the depth of the wheel tracks, the routine proceeds to step 128. In step 128, a moving line is set which is offset by a predetermined distance from the center position between the two wheel tracks. Then, in step 129, the target shift amount is calculated based on the moving line set in step 128, and the routine proceeds to step 108 so as to control directional movement of the vehicle 10 according to the calculated target shift amount.

On the other hand, if it is determined, in step 122, that the wheel tracks are not detected, or if it is determined, in step 126, that the moving line to reduce the depth of the wheel tracks should not be set, the routine proceeds to step 130. In step 130, it is determined whether or not behavior or motion of the vehicle 10 is stable. If it is determined that the behavior of the vehicle 10 is stable, then the wheels of the vehicle 10 are tracing the wheel tracks. On the other hand, if it is determined that the behavior of the vehicle 10 is not stable, this indicates that an actual moving path of the vehicle 10 does not corresponds to the moving line for tracing the wheel tracks.

Accordingly, if it is determined, in step 130, that the behavior or motion of the vehicle 10 is not stable, the routine proceeds to step 106 of FIG. 8. That is, the moving line is slightly changed by changing the target shift amount. Thereafter, the slight change in the moving path of the vehicle 10 is repeated until a determination is made, in step 130, that the behavior or motion of the vehicle 10 is stable.

On the other hand, if it is determined, in step 130, that the behavior or motion of the vehicle 10 is stable, the routine proceeds to step 132, In step 132, the target shift amount is fixed to a current value. After the target shift amount is fixed, the vehicle 10 continuously traces the wheel tracks unless the positional relationship between the wheel tracks and the reference line 13 is changed. Thus, a stable running or movement of the vehicle 10 is maintained.

As mentioned above, according to the present embodiment, the vehicle 10 can be directionally controlled along one of the moving lines to reduce the depth of the wheel tracks and to trace the wheel tracks. Thus, the automatic steering apparatus according to the present embodiment can efficiently reduce the depth of the wheel tracks formed on the road surface while the vehicle 10 is maintained in a stable running condition.

As mentioned above, in the present embodiment, the vehicle 10 can be directionally controlled along a moving line selected from various moving lines such as a moving line to reduce the depth of wheel tracks, the moving line to avoid a construction area or an accident area, the moving line to provide safety in a curve, and a moving line to maintain a stable running condition when wheel tracks are already formed with a considerable depth.

Additionally, in the present embodiment, since the automatic steering apparatus is always operated, when an abnormal condition occurs in the automatic steering apparatus, the abnormal condition can be immediately detected. In this regards, the present embodiment has a superior effect over the conventional automatic steering apparatus with respect to safety.

In the present embodiment, it is determined by the ECU 20 as to which moving line is taken for the vehicle 10. However, a driver of the vehicle 10 may select the moving line. Additionally, in the present embodiment, the moving line is selected from among four moving lines including the moving line for preventing or reducing formation of wheel tracks, the moving line for avoiding a construction area or an accident area, the moving line for maintaining safety in a curve and the moving line for cooperating with wheel tracks formed on the road. However, the present invention is not limited to the selection of the moving line from among the above-mentioned four moving lines. It should be understood that the selection of the moving line from among some of the moving lines or an achievement of a single moving line is within the scope of the present invention.

Additionally, in the present embodiment, the amplification rate for each of the magnetic pickup sensors 22 and 24 is changed, and the operation of the electric motor 38 is controlled so that the amplified output signals become equal to each other. However, the present invention is not limited to this structure, and the electric motor 38 may be driven so that a ratio between the output signals becomes a predetermined value.

Further, the mechanism to change the position of the vehicle 10 relative to the reference line 13 is not limited to the above-mentioned embodiment in which the output characteristic of each of the magnetic pickup sensors 22 and 24 is changed. That is, in an alternative case, positions of the magnetic pickup sensors 22 and 24 may be changed by a mechanical means.

Figure 10:
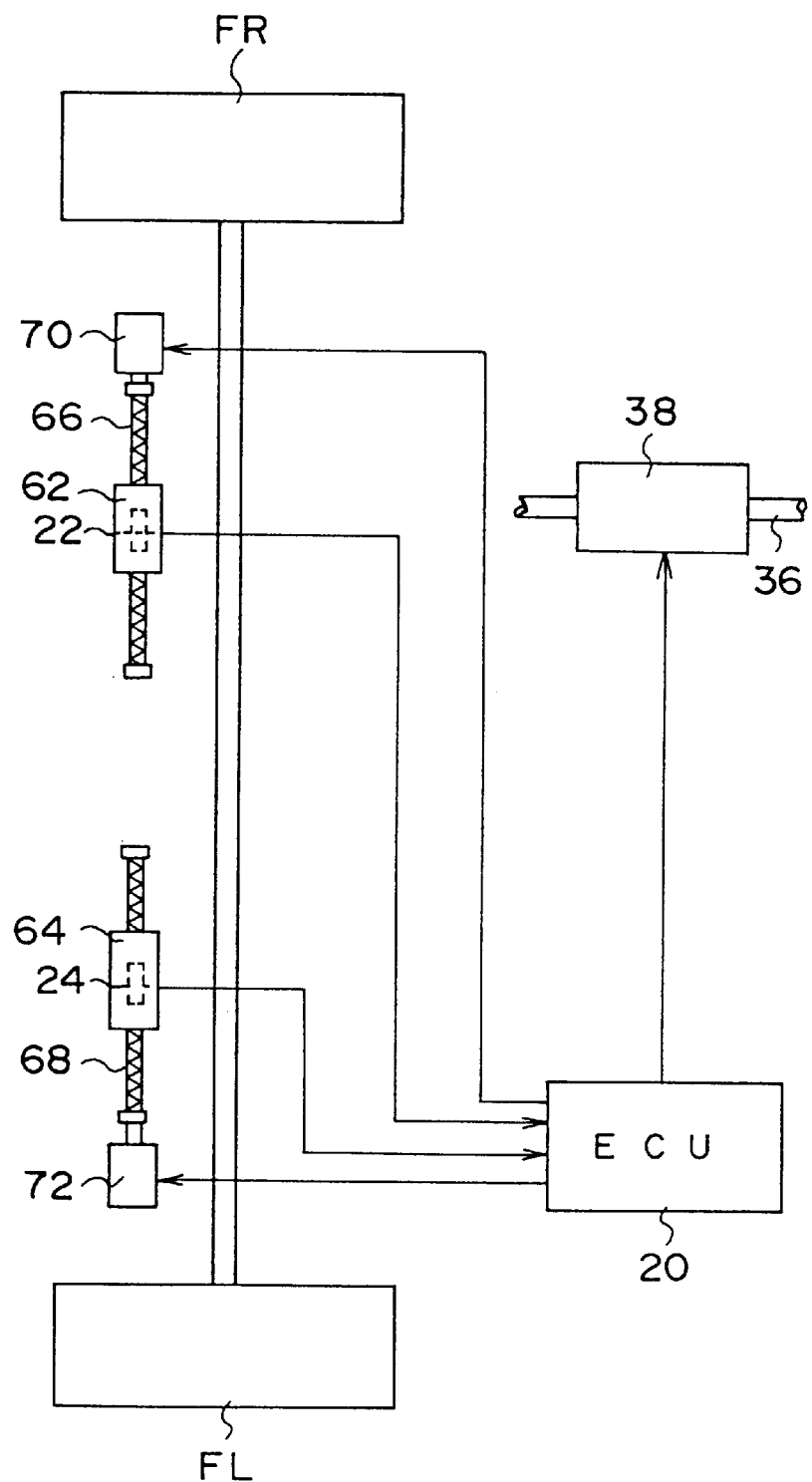
FIG. 10 is an illustration of a structure for moving positions of magnetic pickup sensors shown in FIG. 2.

FIG. 10 is an illustration of a structure for moving the positions of the magnetic pickup sensors 22 and 24. In FIG. 10, the magnetic pickup sensors 22 and 24 are fixed to moving heads 62 and 64, respectively. The moving heads are moved by moving mechanisms comprising ball screws 66 and 68 and stepping motors 70 and 72.

In FIG. 10, the ECU 20 controls each of the stepping motors 70 and 72 so that the moving heads 62 and 64 are moved leftwardly when the vehicle center is to be moved to the right of the reference line 13. On the contrary, the ECU 20 controls each of the stepping motors 70 and 72 so that the moving heads 62 and 64 are moved rightwardly when the vehicle center is to be moved to the left of the reference line 13. Additionally, the ECU 20 controls the electric motor 38 so that the intensities of the magnetic pickup sensors 22 and 24 becomes equal to each other.

The intensity of each of the output signals of the magnetic pickup sensors 22 and 24 becomes equal to each other when the vehicle 10 moves along a moving path by which each of the magnetic markers 12 passes the center between the magnetic pickup sensors 22 and 24. Accordingly, the vehicle having a structure shown in FIG. 10 moves along a moving path by which the center of the magnetic pickup sensors 22 and 24 is aligned with the reference line 13 of the road. Thus, when the moving heads are moved as mentioned above, the vehicle 10 moves along the moving line determined by the ECU 20.

In the present embodiment, the magnetic markers 12 are used as means for generating magnetic signals along the reference line 13, and the magnetic pickup sensors 22 and 24 are used to detect the magnetic signals. However, the signals generated along the reference line 13 are not limited to the magnetic signals, and other signals such as a laser beam, an infrared beam or an ultrasonic wave may be used. Additionally, an image recognition of a white line may instead be used to provide the reference line 13.

Figure 11:
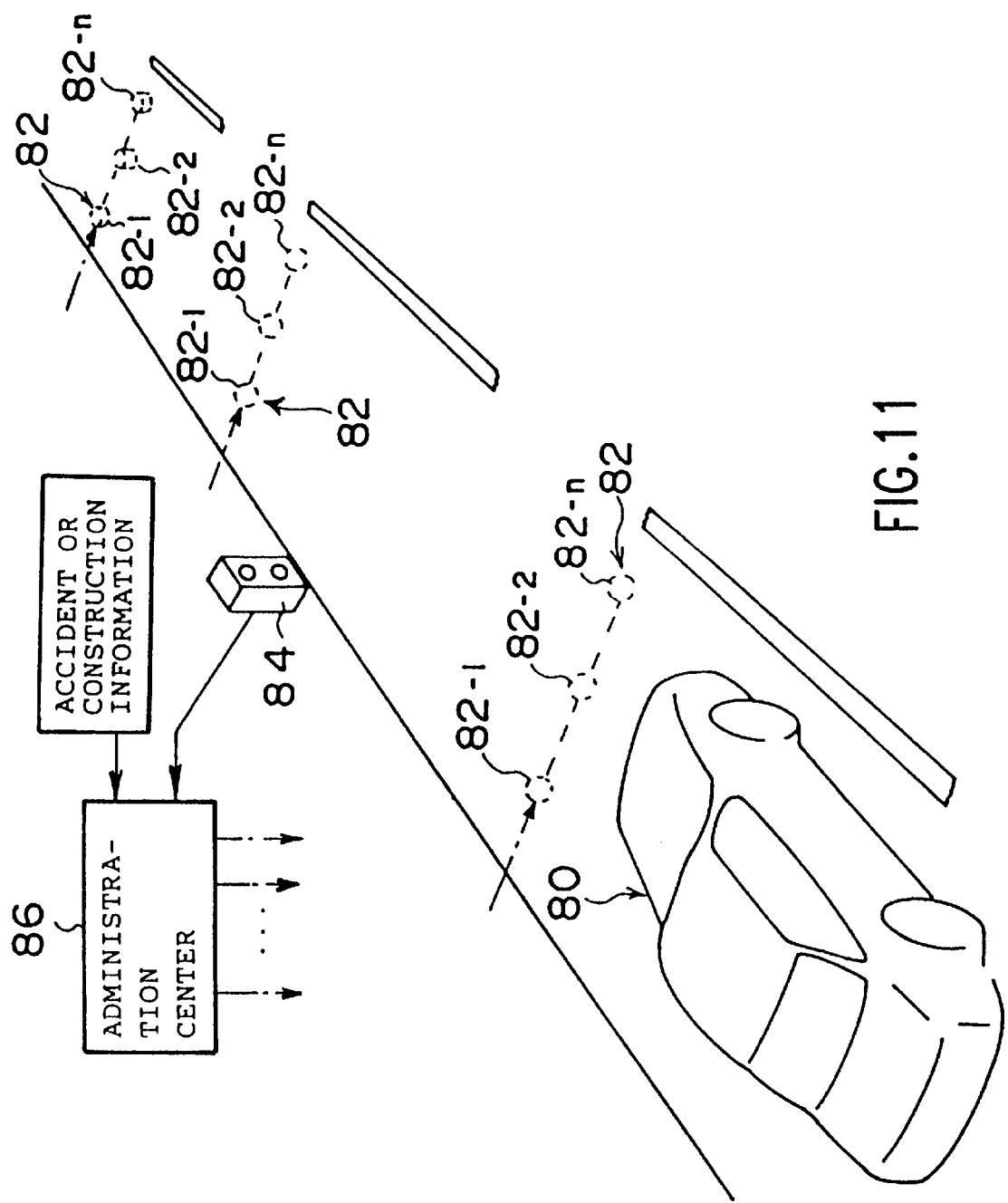
FIG. 11 is an illustration of a structure of an automatic vehicle directional movement control system using a vehicle having an automatic steering apparatus used in an automatic steering system according to a second embodiment of the present invention.

A description will now be given of a second embodiment of the present invention. FIG. 11 is an illustration of a structure of an automatic vehicle directional movement control system for a vehicle 80 having an automatic steering apparatus used in an automatic steering system according to the second embodiment of the present invention. The automatic steering system according to the second embodiment is achieved by a simple automatic steering apparatus provided in a vehicle 80.

In the present embodiment, the infrastructure comprises a plurality of groups of magnetic markers 82, a monitor camera 84 located on a road side, and an administration center communicating with the magnetic markers 82 and the monitor camera 84.

Each group of magnetic markers comprises a plurality of magnetic markers 82-1 to 82-n. In the present embodiment, one magnetic marker is selected to generate a magnetic signal from each group of magnetic markers 82-1 to 82-n. A magnetic marker 82-k is selected by a signal supplied from the administration center 86. Hereinafter, a line connecting the magnetic markers 82-k in each group of magnetic markers is referred to as a reference line 83.

The monitor camera 84 is provided for monitoring a condition of wheel tracks formed on the road. Image data of the monitor camera 84 is supplied to the administration center 86. The administration center 86 is provided with information including road construction information and accident information in addition to the image data generated by the monitor camera 84. The administration center 86 selects the magnetic marker 82-k which should generate a magnetic signal based on the construction information, the accident information and the image data.

Figure 12:
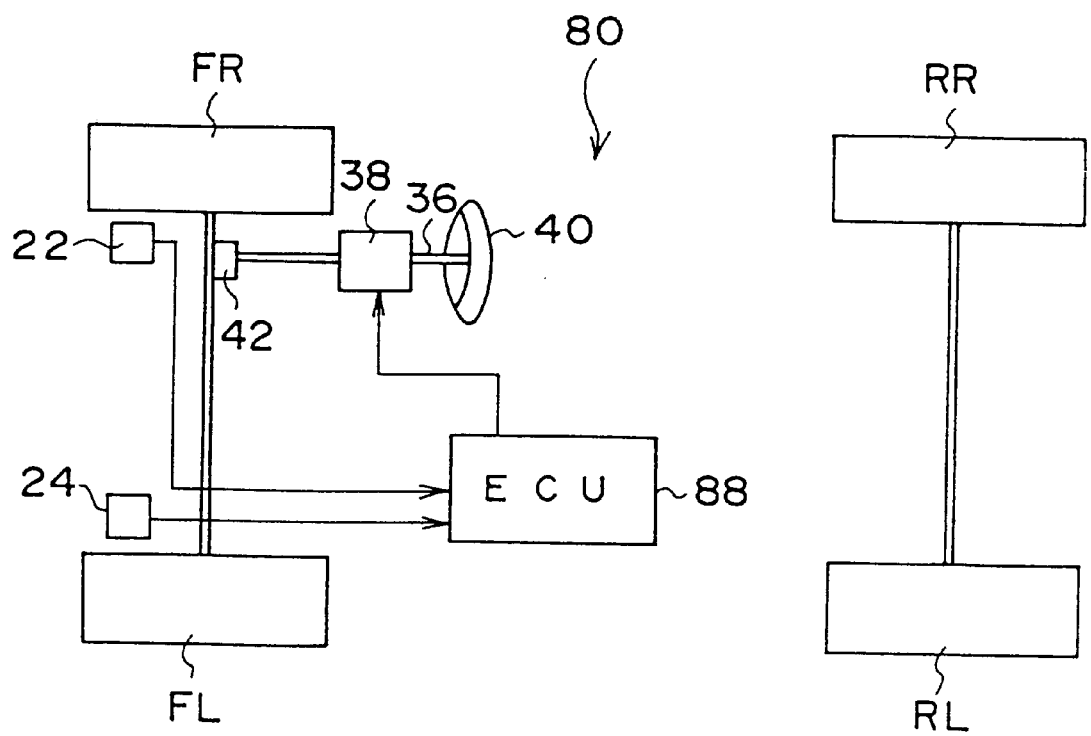
FIG. 12 is a block diagram of the automatic steering apparatus provided on the vehicle shown in FIG. 11.

FIG. 12 is a block diagram of the automatic steering apparatus provided on the vehicle 80. In FIG. 12, parts that are the same as the parts shown in FIG. 2 are given the same reference numerals, and descriptions thereof will be omitted.

As shown in FIG. 12, the automatic steering system according to the present embodiment comprises the magnetic pickup sensors 22 and 24, the electric motor 38 for applying a torque to the left and right front wheels FL and FR and an ECU 88 for controlling the electric motor 38.

Figure 13:
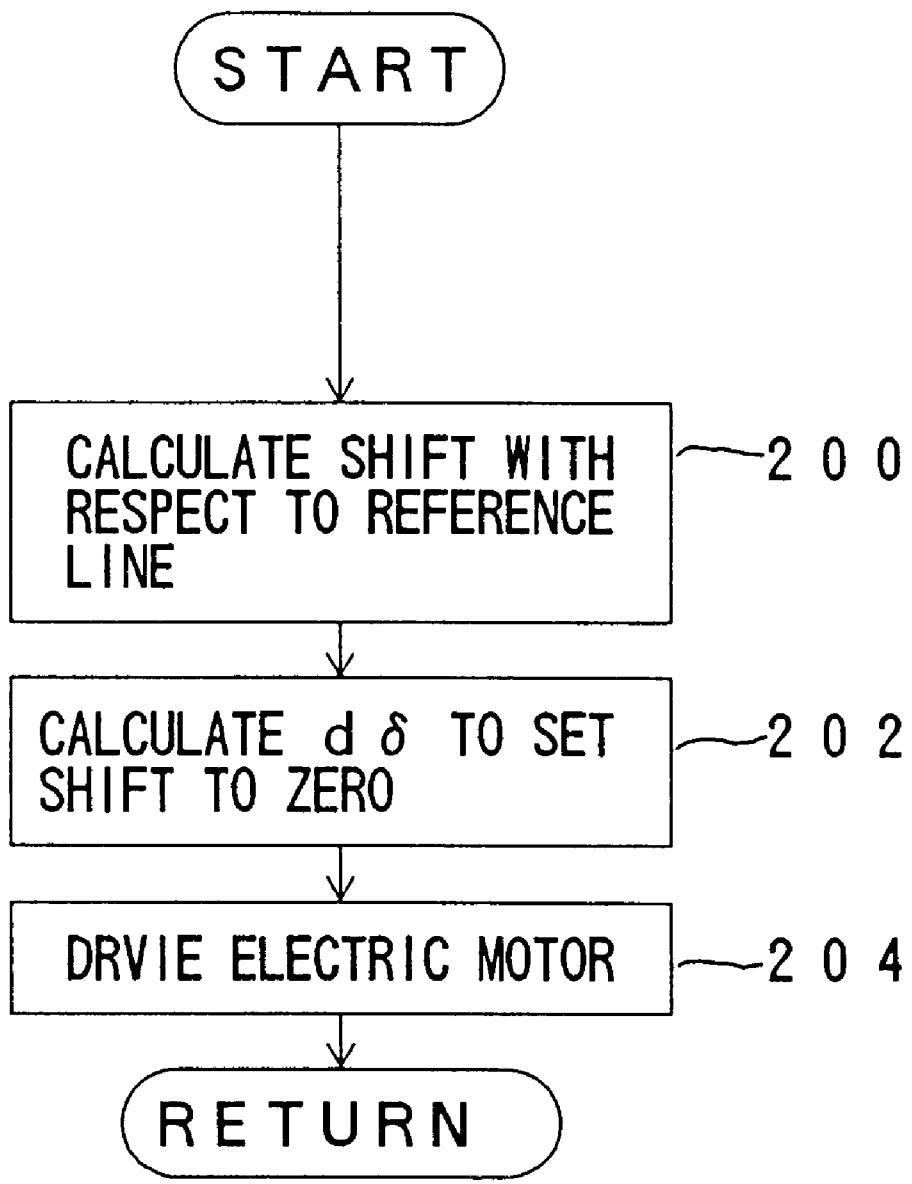
FIG. 13 is a flowchart of an operation performed by an ECU shown in FIG. 12.

In the present embodiment, the ECU 21 performs an operation shown in FIG. 13. When the operation shown in FIG. 13 is started, a shift amount relative to the reference line 83 is calculated, in step 200, based on the output signals of the magnetic pickup sensors 22 and 24. In the present embodiment, the output characteristic of each of the magnetic pickup sensors 22 and 24 is always constant. Accordingly, a ratio between the intensities of the output signals of the magnetic pickup sensors 22 and 24 represents the shift amount of the vehicle center and a direction of the shift. Thus, in the present embodiment, the shift amount between the vehicle center and the reference line 83 is calculated based on the ratio between the intensities of the output signals of the magnetic pickup sensors 22 and 24.

After the process of step 200 is completed, a steering amount dδ is calculated, in step 202, to reduce the shift amount between the vehicle center and the reference line 83 to zero. Thereafter, in step 204, the electric motor 38 is operated to achieve the steering amount dδ, and the routine is ended. When the ECU 88 performs this operation, the vehicle 80 runs along the reference line 83 while the vehicle center is aligned with the reference line 83.

Figure 14:
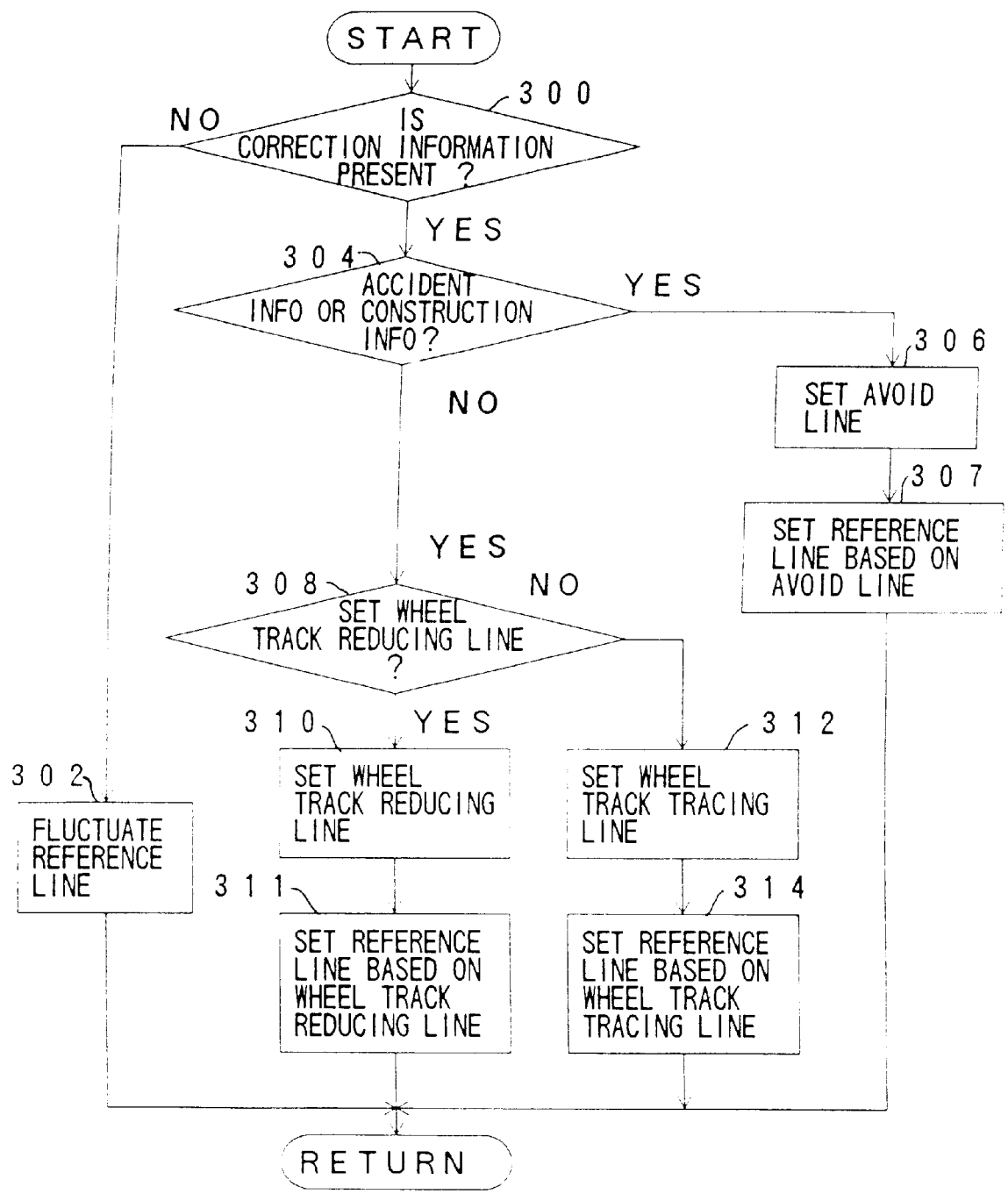
FIG. 14 is a flowchart of an operation performed by an administration center shown in FIG. 11.

In the present embodiment, the administration center 86 performs an operation shown in FIG. 14. When the operation shown in FIG. 14 is started, it is determined, in step 300, whether or not there is correction information with respect to the moving path. In this operation, it is determined that the correction information is present when one of the following conditions is detected; 1) a guiding signal for avoiding a construction area or an accident area is received by the administration center 86; and 2) wheel tracks are detected by the monitor camera 84.

If it is determined, in step 300, that there is no correction information, the routine proceeds to step 302. In step 302, the selected magnetic marker 82-k generating the magnetic signal is changed to another magnetic marker among each group of the magnetic markers 82-1 to 82-n so that the reference line 83 fluctuates with respect to the center of the lane. The change of the magnetic marker 82-k generating the magnetic signal is performed randomly in accordance with the time function as shown in FIG. 4 or 5.

As mentioned above, the vehicle 80 traces the reference line 83 of the road. Accordingly, if the reference line 83 fluctuates with respect to the center of the lane, the moving path of the vehicle 80 is fluctuated in a transverse direction of the lane with respect to passage of time. Thus, wear of the road surface is distributed in the transverse direction of the road, resulting in suppression of formation of wheel tracks. Thus, the present embodiment has an effect on suppressing formation of wheel tracks similar to the first embodiment of the present invention.

On the other hand, if it is determined, in step 300, that there is correction information with respect to the moving path, the routine proceeds to step 304. It is determined, in step 304, whether or not the information with respect to an accident or road construction has been received. If it is determined that the information has been received, the routine proceeds to step 306. In step 306, an avoid line for avoiding the construction area or the accident area is set.

Then, in step 307, a process is performed to change the magnetic marker generating the magnetic signal in the vicinity of the construction area or the accident area so that the reference line corresponds to the avoid line.

When the above-mentioned process is performed, the vehicle 80 moves along the moving path which avoids the construction area or the accident area. Accordingly, the present embodiment also has an effect of maintaining a smooth running of the vehicle 80 even when an unexpected condition occurs on the road similar to the first embodiment of the present invention.

If it is determined, in step S304, that the information with respect to an accident or a road construction has not been reported, it is determined that the condition of step 300 is established due to the presence of wheel tracks on the road, and the routine proceeds to 308. In step 308, it is determined whether or not a moving path for suppressing formation of wheel tracks should be set. In the present embodiment, similar to the first embodiment, the determination is made based on whether or not a depth of the wheel tracks exceeds a predetermined threshold value.

If it is determined that the moving path should be set to reduce the depth of the wheel tracks, the routine proceeds to step 310. In step 310, a wheel track reducing line is set by which the vehicle center is set off a predetermined distance from the center between the two wheel tracks. Then, in step 311, a process is performed to change the magnetic marker 82-k generating the magnetic signal so that the reference line corresponds to the wheel track reducing line set in step 310.

When the above-mentioned operation is performed, the vehicle 80 moves along the wheel track reducing line by which the wheels of the vehicle 80 are offset from the wheel tracks. Thus, the road surface adjacent to the wheel tracks is worn, resulting in a decrease in the depth of the wheel tracks formed on the road surface and provides a more even road surface when the wheel tracks of the reducing line begin to wear.

If it is determined, in step 308, that the moving line for reducing the depth of the wheel tracks should not be set, the routine proceeds to step 312. In step 312, a wheel track tracing line is set which corresponds to the center between the two wheel tracks formed on the road. Then, in step 314, a process is performed to change the magnetic marker 82-k generating the magnetic signal so that the reference line 83 corresponds to the wheel track tracing line. Thus, in the present embodiment, similar to the first embodiment, a stable behavior or motion of the vehicle 80 can be obtained when deep wheel tracks are formed on the road.

As mentioned above, the construction of the automatic steering apparatus provided on the vehicle 80 according to the present embodiment is simple as compared to that of the vehicle 10 according to the first embodiment while almost the same effects are obtained as the effects obtained by the automatic steering apparatus provided on the vehicle 10 according to the first embodiment of the present invention.

Figure 15:
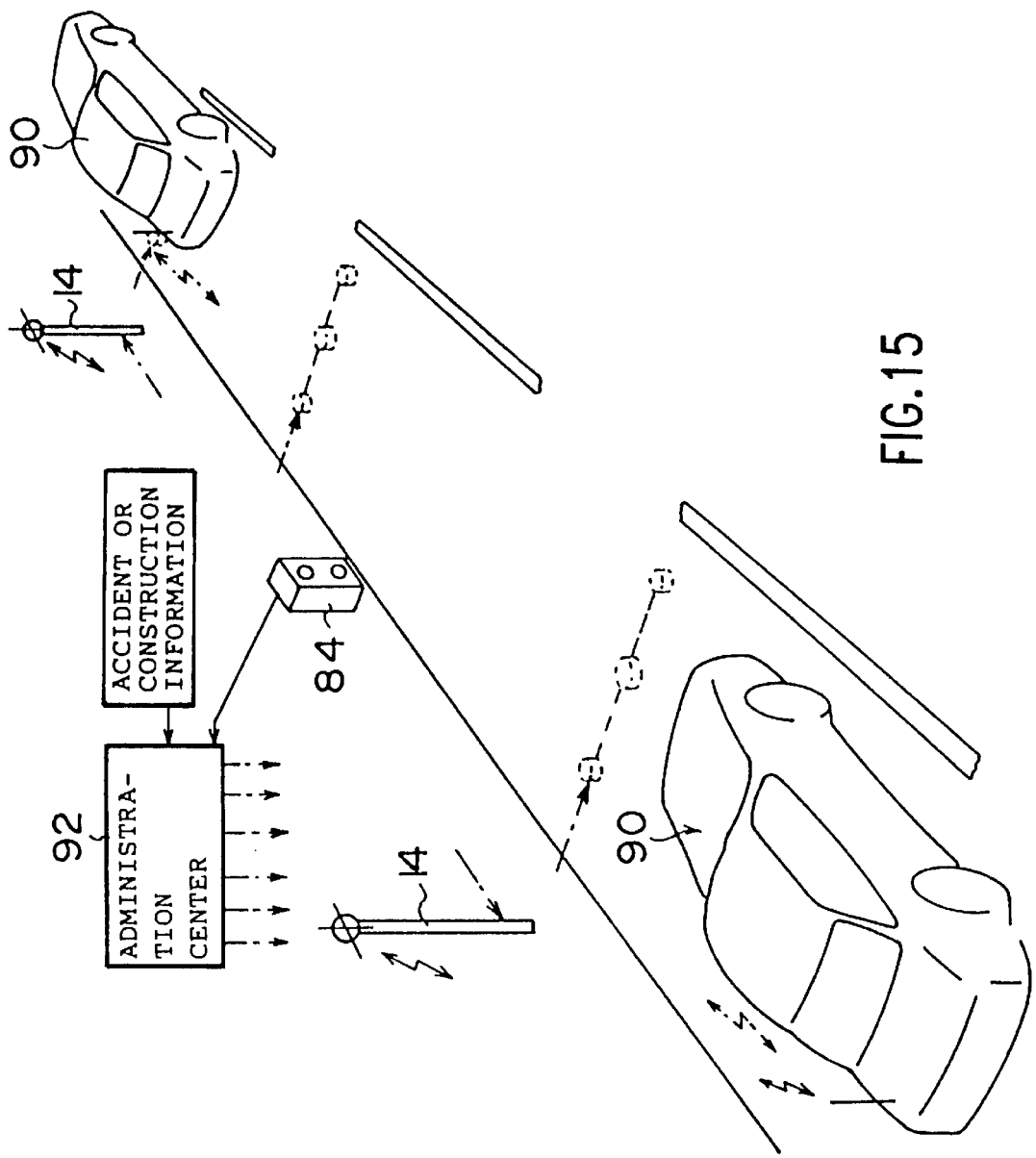
FIG. 15 is an illustration of a structure of an automatic vehicle directional movement control system using a vehicle having an automatic steering apparatus used in an automatic steering system according to a third embodiment of the present invention.

A description will now be given of a third embodiment of the present invention. FIG. 15 is an illustration of a structure of an automatic vehicle directional movement control system for a vehicle 90 having an automatic steering apparatus used in an automatic steering system according to the third embodiment of the present invention. The automatic steering system according to the third embodiment corresponds to a combination of the first embodiment and the second embodiment of the present invention. In FIG. 15, parts that are the same as the parts shown in FIGS. 1 and 11 are given the same reference numerals, and descriptions thereof will be omitted.

In the third embodiment, the vehicle 90 has an automatic steering apparatus having a basic structure the same as that of the automatic steering apparatus shown in FIG. 2. The communications apparatus 34 provided on the vehicle 90 receives a signal transmitted from the beacons 14, and also receives a signal transmitted by other vehicles. Additionally, the communications apparatus 34 can transmit information with regard to running or movement conditions of the vehicle 90 and road conditions to the beacons 14 and other vehicles.

As mentioned above, since the present embodiment is a combination of the first embodiment and the second embodiment, the present embodiment has the advantageous effects of the first embodiment and the second embodiment. Additionally, since the vehicle 90 can communicate with other vehicles and also communicate with the infrastructure, the present embodiment has the following advantageous effects.

That is, when the vehicle 90 (following vehicle) communicates with a front vehicle running ahead of the vehicle 90, information obtained by the front vehicle can be electively used by the following vehicle 90. For example, if information is transmitted to the following vehicle 90 when the front vehicle enters a curve, the following vehicle 90 can determine the curve with a high accuracy (the process of step 116 of FIG. 9) even if the navigation apparatus NAVI 28 is not provided on the following vehicle 90. Additionally, the following vehicle is able to achieve smooth running by utilizing information received from the front vehicle with respect to deceleration or a lane change of the front vehicle due to wet or icy road condition or an obstacle or a hole in the road.

Additionally, the front vehicle may supply to the following vehicle 90 information with respect to an influence of wheel tracks formed on the road when behavior or motion of the front vehicle is irregular due to the wheel tracks. Thus, the following vehicle 90 can obtain information of the influence of the wheel tracks beforehand, and thus a moving line to avoid the influence of the wheel tracks can be taken quickly.

Further, if the front vehicle encounters an accident area or a road construction area of which information has not been reported to the administration center 92, the front vehicle may supply to the following vehicle 90 information with respect to the road construction area or the accident area. Thus, the following vehicle 90 can quickly set an avoid line to avoid the road construction area or the accident area.

Additionally, when communication is performed between the vehicle 90 and the infrastructure, the vehicle 90 can be guided while considering conditions of the vehicle 90. For example, if the vehicle 90 supplies information with respect to vehicle speed to the infrastructure when the vehicle 90 enters a curve, the infrastructure may set an appropriate moving line in consideration with map data including a radius of curvature and a width of the road and vehicle speed. The vehicle can be guided to trace the moving line set by the infrastructure.

Further, when the vehicle 90 detects a state of wheel tracks based on behavior or motion of the vehicle 90 or image data taken by the camera 26, information with respect to the detection may be supplied to the infrastructure. Thus, the infrastructure can obtain information with respect to the state of wheel tracks in an area where the monitor camera 84 is not installed. In this regard, the present embodiment is effective to reduce installation cost of the infrastructure.

Additionally, when the vehicle 90 encounters an accident area or a road construction area, information with respect to the accident area or the road construction area may be supplied to the infrastructure. This may drastically increases information collection capability of the administration center 92. Thus, according to the present embodiment, the vehicle 90 can be automatically run or operated in a wide area with high reliability while avoiding road construction or an accident area.

As mentioned above, the automatic steering system according to the present embodiment can use information more effectively than the first and second embodiment, and has advantageous effects in guiding the vehicle 90 to an appropriate moving line in a curve, cooperating with wheel tracks formed on the road and detecting and cooperating with an accident area or a road construction area.

The present invention is not limited to the specifically disclosed embodiments, and variations and modifications may be made without departing the scope of the present invention.

What is claimed is:

1. An automatic steering system comprising:
   a reference line provided along a road providing to a vehicle traveling on the road an indication of the path along which the road extends;
   means for determining a target amount of shift from the reference line in a direction substantially perpendicular to the reference line, wherein the amount of shift is a distance in a direction substantially perpendicular to the reference line between a position of the vehicle and the reference line;
   means for controlling a position of the vehicle relative to the reference line to achieve the target amount of shift; and
   fluctuating means for changing the target amount of shift over time to change over time a moving line over which the vehicle is to be moved.

2. The automatic steering system as claimed in claim 1, wherein the fluctuating means changes the target amount of shift in accordance with a predetermined time function.

3. The automatic steering system as claimed in claim 2, wherein the reference line is defined by a plurality of markers provided along the road, each of the markers generating a signal, and wherein the fluctuating means comprises a plurality of detecting units provided on the vehicle to detect the signals, wherein a current amount of shift of the vehicle is determined based on a difference in intensity between outputs of the detecting units.

4. The automatic steering system as claimed in claim 3, wherein each of the detecting units comprises a sensor for detecting said signals and a corresponding amplification unit for amplifying an output of the corresponding sensor, wherein the target amount of shift is set by changing amplification rates of the amplification units relative to one another.

5. The automatic steering system as claimed in claim 1, further comprising wheel track detecting means for detecting a state of wheel tracks formed on the road, wherein the means for fluctuating means adjusts the target amount of shift based on the detected state of the wheel tracks.

6. The automatic steering system as claimed in claim 5, wherein said reference line is defined by a plurality of markers provided along the road, each of the markers generating a signal, and wherein the fluctuating means comprises a plurality of detecting units provided on the vehicle to detect the signals, wherein a current amount of shift of the vehicle is determined based on a difference in intensity between outputs of the detecting units.

7. The automatic steering system as claimed in claim 6, wherein each of the detecting units comprises a sensor for detecting said signals and a corresponding amplification unit for amplifying an output of the corresponding sensor, wherein the target amount of shift is set by changing amplification rates of the amplification units relative to one another.

8. The automatic steering system as claimed in claim 1, wherein the fluctuating means further comprises means for determining a road condition and for changing the based on the road condition to change the moving line.

9. The automatic steering system as claimed in claim 8, wherein said reference line is defined by a plurality of markers provided along the road, each of the markers generating a signal, and wherein the fluctuating means comprises a plurality of detecting units provided on the vehicle to detect the signals, wherein a current amount of shift of the vehicle is determined based on a difference in intensity between outputs of the detecting units.

10. The automatic steering system as claimed in claim 9, wherein each of the detecting units comprises a sensor for detecting the signals and a corresponding amplification unit for amplifying an output of the corresponding sensor, wherein the target amount of shift is set by changing amplification rates of the amplification units relative to one another.

11. The automatic steering system as claimed in claim 8, wherein the fluctuating means comprises communication means for providing communication between the vehicle and an administration center.

12. The automatic steering system as claimed in claim 11, wherein the communication is performed via a plurality of beacons provided along the road.

13. The automatic steering system as claimed in claim 11, wherein information regarding road conditions is transmitted between the administration center and the vehicle.

14. The automatic steering system as claimed in claim 8, wherein the fluctuating means comprises communication means for providing communication between the vehicle and other vehicles running on the road the to communicate information with respect to road conditions.

15. The automatic steering system as claimed in claim 1, further comprising a plurality of markers provided along the road, wherein the markers are arranged in a plurality of groups of markers, each group of markers extending across the road in a direction substantially perpendicular to direction in which the road extends, the groups of markers being separated from one another at predetermined intervals in the direction in which the road extends, and wherein selected markers are detected to generate signals defining the reference line.

16. The automatic steering system as claimed in claim 15, wherein the target amount of shift is set to zero.

17. The automatic steering system as claimed in claim 15, wherein the fluctuating means shifts the reference line by altering the markers selected to define the reference line.

18. The automatic steering system as claimed in claim 15, wherein the fluctuating means further comprises a plurality of detecting units provided on the vehicle to detect the signals, wherein a current amount of shift of the vehicle is determined based on a difference in intensity between outputs of the detecting units, and wherein each of the detecting units comprises a sensor for detecting the signals and a corresponding amplification unit for amplifying an output of the corresponding sensor, wherein the target amount of shift is set by changing amplification rates of the amplification units relative to one another.

19. The automatic steering system as claimed in claim 15, further comprising wheel track detecting means for detecting a state of wheel tracks formed on the road, wherein the means for fluctuating means adjusts the target amount of shift based on the detected state of the wheel tracks.

20. The automatic steering system as claimed in claim 19, wherein the fluctuating means comprises a plurality of detecting units provided on the vehicle to detect the signals, wherein the amount of shift is determined based on a difference in intensity between outputs of the detecting units.

21. The automatic steering system as claimed in claim 20, wherein each of the detecting units comprises a sensor for detecting the signals and a corresponding amplification unit for amplifying an output of the corresponding sensor, wherein the target amount of shift is set by changing amplification rates of the amplification units relative to one another.

22. The automatic steering system as claimed in claim 15, wherein the fluctuating means further comprises means for determining a road condition and for changing the target amount of shift based on the road condition to chance the moving line.

23. The automatic steering system as claimed in claim 22, wherein the fluctuating means comprises a plurality of detecting units provided on the vehicle to detect the signals, wherein a current amount of shift of the vehicle is determined based on a difference in intensity between outputs of the detecting units.

24. The automatic steering system as claimed in claim 23, wherein each of the detecting units comprises a sensor for detecting the signals and a corresponding amplification unit for amplifying an output of the corresponding sensor, wherein the target amount of shift is set by changing amplification rates of the amplification units relative to one another.

25. The automatic steering system as claimed in claim 22, wherein the fluctuating means comprises communication means for providing communication between the vehicle and an administration center.

26. The automatic steering system as claimed in claim 25, wherein the communication is performed via a plurality of beacons provided along the road.

27. The automatic steering system as claimed in claim 25, wherein the information regarding road conditions is transmitted between the administration center and the vehicle.

28. The automatic steering system as claimed in claim 22, wherein the fluctuating means comprises communication means for providing communication between the vehicle and other vehicles running on the road the to communicate information with respect to road conditions.

29. An automatic steering system comprising:
   a reference line provided along a road providing to a vehicle traveling on the road an indication of the path along which the road extends;
   means for determining a target amount of shift from the reference line in a direction substantially perpendicular to the reference line, wherein the target amount of shift is a distance in a direction substantially perpendicular to the reference line between a moving line over which the vehicle is to be moved and the reference line;
   means for controlling a position of the vehicle relative to the reference line to achieve the target amount of shift; and
   fluctuating means for changing the target amount of shift over time to change over time a position of the moving line relative to the reference line.

* * * * *

UNITED STATES PATENT AND TRADEMARK OFFICE
CERTIFICATE OF CORRECTION

PATENT NO. : 5,938,707
DATED : August 17, 1999
INVENTOR(S) : Yasuo Uehara

Page 1 of 1

It is certified that error appears in the above-identified patent and that said Letters Patent is hereby corrected as shown below:

Column 4,
Line 43, after "an" insert -- output --;

Column 7,
Line 43, change "d6" to -- d$\delta$ --;

Column 11,
Line 12, change "d6" to -- d$\delta$ --

Signed and Sealed this

First Day of October, 2002

Attest:

Attesting Officer

JAMES E. ROGAN
Director of the United States Patent and Trademark Office